United States Patent
Hosseini et al.

(10) Patent No.: US 12,356,403 B2
(45) Date of Patent: Jul. 8, 2025

(54) SIGNALING AN INDICATION OF A SIDELINK TRANSMISSION

(71) Applicant: QUALCOMM Incorporated, San Diego, CA (US)

(72) Inventors: Seyedkianoush Hosseini, San Diego, CA (US); Wanshi Chen, San Diego, CA (US); Yi Huang, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 233 days.

(21) Appl. No.: 17/446,806

(22) Filed: Sep. 2, 2021

(65) Prior Publication Data
US 2022/0070850 A1 Mar. 3, 2022

Related U.S. Application Data

(60) Provisional application No. 62/706,702, filed on Sep. 3, 2020.

(51) Int. Cl.
*H04W 72/20* (2023.01)

(52) U.S. Cl.
CPC .................... *H04W 72/20* (2023.01)

(58) Field of Classification Search
CPC ..... H04W 72/20; H04W 80/02; H04W 76/14; H04W 4/08; H04W 72/0453; H04W 4/023; H04W 52/0235; H04W 72/543; H04W 52/0216; H04W 76/15; H04L 1/1822; H04L 1/1861; H04L 1/1607; H04B 7/0626

See application file for complete search history.

(56) References Cited

U.S. PATENT DOCUMENTS

| | | | |
|---|---|---|---|
| 2018/0054804 A1* | 2/2018 | Luo | H04W 72/02 |
| 2018/0146494 A1* | 5/2018 | Khoryaev | H04W 76/15 |
| 2020/0029318 A1* | 1/2020 | Guo | H04L 5/0055 |
| 2020/0229195 A1* | 7/2020 | Lien | H04L 5/001 |

(Continued)

FOREIGN PATENT DOCUMENTS

| | | | | |
|---|---|---|---|---|
| CA | 3163032 A1 * | 5/2021 | | H04W 52/0235 |
| EP | 3512276 A1 | 7/2019 | | |

(Continued)

OTHER PUBLICATIONS

S.-Y. Lien et al., "3GPP NR Sidelink Transmissions Toward 5G V2X," in IEEE Access, vol. 8, pp. 35368-35382, 2020, doi: 10.1109/ACCESS.2020.2973706. keywords: {3GPP;OFDM;Relays; Safety;Synchronization;Base stations;Uplink;3GPP NR;sidelink;V2X;fifth generation (5G) networks;device-to-device (D2D)}, (Year: 2020).*

(Continued)

*Primary Examiner* — Ayaz R Sheikh
*Assistant Examiner* — Louis Samara
(74) *Attorney, Agent, or Firm* — Harrity & Harrity, LLP

(57) ABSTRACT

Various aspects of the present disclosure generally relate to wireless communication. In some aspects, a first user equipment (UE) may transmit, to a second UE, an indication of a transmission on a sidelink resource from the first UE to the second UE. The UE may transmit, to the second UE, data on the sidelink resource based at least in part on the indication of the transmission. Numerous other aspects are provided.

30 Claims, 15 Drawing Sheets

(56) References Cited

U.S. PATENT DOCUMENTS

| | | | |
|---|---|---|---|
| 2020/0236656 A1* | 7/2020 | Cao | H04W 76/27 |
| 2020/0328865 A1* | 10/2020 | Choi | H04W 4/06 |
| 2020/0359163 A1* | 11/2020 | Kwon | H04W 72/23 |
| 2020/0359408 A1 | 11/2020 | Faurie et al. | |
| 2021/0037468 A1* | 2/2021 | Huang | H04W 52/0216 |
| 2021/0050950 A1* | 2/2021 | Zhou | H04L 1/1854 |
| 2021/0336728 A1* | 10/2021 | Selvanesan | H04L 1/1607 |
| 2022/0131589 A1* | 4/2022 | Li | H04B 7/0626 |
| 2022/0322472 A1* | 10/2022 | Kusashima | H04W 76/15 |
| 2022/0346081 A1* | 10/2022 | Luo | H04W 72/543 |
| 2022/0361227 A1* | 11/2022 | Lee | H04L 5/0053 |
| 2023/0072047 A1* | 3/2023 | Beale | H04W 52/0229 |

FOREIGN PATENT DOCUMENTS

| | | | | |
|---|---|---|---|---|
| WO | WO-2018064477 A1 * | 4/2018 | | |
| WO | WO-2019028900 A1 * | 2/2019 | | H04W 24/10 |
| WO | WO-2019160788 A1 * | 8/2019 | | H04W 72/10 |
| WO | WO-2020144261 A1 * | 7/2020 | | H04L 1/1607 |

OTHER PUBLICATIONS

International Search Report and Written Opinion—PCT/US2021/071369—ISA/EPO—Jan. 7, 2022.

Zte, et al., "Consideration on NR V2X Mode 1 Resource Allocation", 3GPP Draft, R2-1816980, Consideration on NR V2X Mode 1 Resource Allocation, 3rd Generation Partnership Project (3GPP), Mobile Competence Centre, 650, Route Des Lucioles, F-06921 Sophia-Antipolis Cedex, France, vol. RAN WG2, No. Spokane, USA, Nov. 12, 2018-Nov. 16, 2018, XP051556536, Nov. 2, 2018 (Nov. 2, 2018-), 4 Pages, Retrieved from the Internet: URL: http://www.3gpp.org/ftp/Meetings%5F3GPP%5FSYNC/RAN2/Docs/R2%2D1816980%2Ezip [retrieved on Nov. 12, 2018] p. 2, paragraph 2.1.1, URL: http://www.3gpp.org/ftp/Meetings%5F3GPP%5FSYNC/RAN2/Docs/R2%2D1816980%2Ezip [retrieved on Nov. 2, 2018], the whole document.

* cited by examiner

SIGNALING AN INDICATION OF A SIDELINK TRANSMISSION

CROSS-REFERENCE TO RELATED APPLICATION

This patent application claims priority to U.S. Provisional Patent Application No. 62/706,702, filed on Sep. 3, 2020, entitled "SIGNALING AN INDICATION OF A SIDELINK TRANSMISSION," and assigned to the assignee hereof. The disclosure of the prior application is considered part of and is incorporated by reference into this patent application.

INTRODUCTION

Aspects of the present disclosure generally relate to wireless communication and to techniques and apparatuses for signaling related to sidelink transmissions.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a first UE includes transmitting, to a second UE, an indication of a transmission on a sidelink resource from the first UE to the second UE. In some aspects, the method includes transmitting, to the second UE, data on the sidelink resource based at least in part on the indication of the transmission.

In some aspects, a method of wireless communication performed by a first UE includes receiving, from a second UE, an indication of a transmission on a sidelink resource from the second UE to the first UE. In some aspects, the method includes receiving, from the second UE, data on the sidelink resource based at least in part on the indication of the transmission.

In some aspects, a first UE for wireless communication includes a memory and one or more processors coupled to the memory. The memory and the one or more processors may be configured to transmit, to a second UE, an indication of a transmission on a sidelink resource from the first UE to the second UE. The memory and the one or more processors may be configured to transmit, to the second UE, data on the sidelink resource based at least in part on the indication of the transmission.

In some aspects, a first UE for wireless communication includes a memory and one or more processors coupled to the memory. The memory and the one or more processors may be configured to receive, from a second UE, an indication of a transmission on a sidelink resource from the second UE to the first UE. The memory and the one or more processors may be configured to receive, from the second UE, data on the sidelink resource based at least in part on the indication of the transmission.

In some aspects, a non-transitory computer-readable medium storing a set of instructions for wireless communication includes one or more instructions that, when executed by one or more processors of a first UE, cause the first UE to transmit, to a second UE, an indication of a transmission on a sidelink resource from the first UE to the second UE. The one or more instructions, when executed by one or more processors of the first UE, cause the first UE to transmit, to the second UE, data on the sidelink resource based at least in part on the indication of the transmission.

In some aspects, a non-transitory computer-readable medium storing a set of instructions for wireless communication includes one or more instructions that, when executed by one or more processors of a first UE, cause the first UE to receive, from a second UE, an indication of a transmission on a sidelink resource from the second UE to the first UE. The one or more instructions, when executed by one or more processors of the first UE, cause the first UE to receive, from the second UE, data on the sidelink resource based at least in part on the indication of the transmission.

In some aspects, a first apparatus for wireless communication includes means for transmitting, to a second apparatus, an indication of a transmission on a sidelink resource from the first apparatus to the second apparatus. In some aspects, the apparatus includes means for transmitting, to the second apparatus, data on the sidelink resource based at least in part on the indication of the transmission.

In some aspects, a first apparatus for wireless communication includes means for receiving, from a second apparatus, an indication of a transmission on a sidelink resource from the second apparatus to the first apparatus. In some aspects, the apparatus includes means for receiving, from the second apparatus, data on the sidelink resource based at least in part on the indication of the transmission.

In some aspects, a method of wireless communication performed by a base station includes receiving, from a first UE, a request to activate a sidelink resource based at least in part on an indication of a transmission on the sidelink resource communicated between the first UE and a second UE; and transmitting, to the first UE, a response indicating that the sidelink resource has been activated for sidelink communication between the first UE and the second UE.

In some aspects, a base station for wireless communication includes a memory; and one or more processors coupled to the memory, the memory and the one or more processors configured to: receive, from a first UE, a request to activate a sidelink resource based at least in part on an indication of a transmission on the sidelink resource communicated between the first UE and a second UE; and transmit, to the first UE, a response indicating that the sidelink resource has been activated for sidelink communication between the first UE and the second UE.

In some aspects, a non-transitory computer-readable medium storing a set of instructions for wireless communication includes one or more instructions that, when executed by one or more processors of a base station, cause the base station to: receive, from a first UE, a request to activate a sidelink resource based at least in part on an indication of a transmission on the sidelink resource communicated between the first UE and a second UE; and transmit, to the first UE, a response indicating that the sidelink resource has been activated for sidelink communication between the first UE and the second UE.

In some aspects, an apparatus for wireless communication includes means for receiving, from a first UE, a request to activate a sidelink resource based at least in part on an indication of a transmission on the sidelink resource communicated between the first UE and a second UE; and means for transmitting, to the first UE, a response indicating that the sidelink resource has been activated for sidelink communication between the first UE and the second UE.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
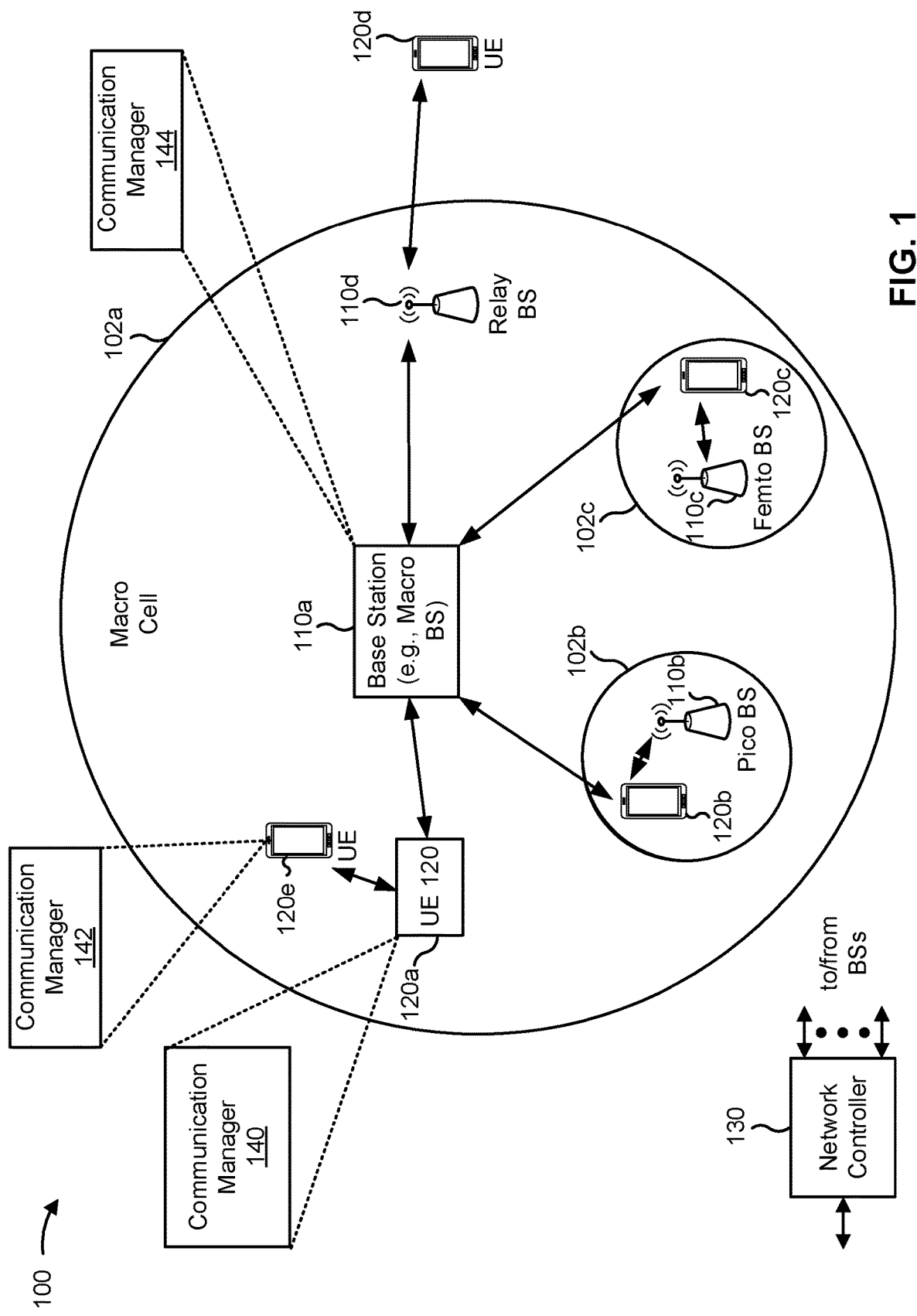
FIG. 1 is a diagram illustrating an example of a wireless network, in accordance with the present disclosure.

A first UE may transmit and/or receive data over a sidelink interface with a second UE. For example, the first UE may monitor a plurality of sidelink resources to successfully receive data from the second UE. Depending on a device type of the first UE, monitoring the plurality of sidelink resources may increase power consumption at the first UE. For example, the first UE may be a wearable device, such as a head-mounted display, a smart watch, and/or the like, for which power efficient sidelink operation may be important for increased battery life. The first UE may be a low-capability UE, such as a reduced capability (RedCap) UE, an Internet of Things UE, a machine-type communication UE, a low-power UE, a UE associated with a diminished radio frequency capability, and/or the like. When transmitting data to the second UE, the first UE may sense and reserve available sidelink resources, which may also increase power consumption at the first UE. A resource allocation for sidelink operation that reduces power consumption may be beneficial to the first UE and/or the second UE.

In various aspects of techniques and apparatuses described herein, resource allocation between a first UE and a second UE may involve the first UE transmitting an indication of an upcoming transmission to the second UE. In other words, the indication may notify the second UE that a sidelink transmission is to occur from the first UE. The indication may further specify a configured sidelink resource to be used by the first UE to perform the sidelink transmission. The second UE may determine that the configured sidelink resource indicated by the first UE does not cause a collision with another sidelink transmission. The second UE may notify the first UE that the configured sidelink resource is available for the first UE to use. The first UE may perform the sidelink transmission with the second UE using the configured sidelink resource, which was previously indicated from the first UE to the second UE.

By transmitting the indication of the upcoming sidelink transmission on the configured sidelink resource and later performing the sidelink transmission on the configured sidelink resource, the first UE may not perform sensing and reservation of available sidelink resources, which reduces power consumption at the first UE. Additionally, by receiving the indication of the configured sidelink resource ahead of time (e.g., before the sidelink transmission occurs on the configured sidelink resource), the second UE may not monitor a plurality of sidelink resources to receive the sidelink transmission from the first UE, thereby saving power at the second UE.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In some aspects, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As shown in FIG. 1, the UE 120a may include a communication manager 140. As described in more detail elsewhere herein, the communication manager 140 may transmit, to a second UE, an indication of a transmission on a sidelink resource to the second UE. The communication manager 140 may also transmit, to the second UE, data on the sidelink resource based at least in part on the indication of the transmission. In some aspects, the communication manager 140 may receive, from a second UE, an indication of a transmission on a sidelink resource from the second UE. The communication manager 140 may also receive, from the second UE, data on the sidelink resource based at least in part on the indication of the transmission. Additionally, or alternatively, the communication manager 140 may perform one or more other operations described herein.

As shown in FIG. 1, the UE 120e may include a communication manager 142. As described in more detail elsewhere herein, the communication manager 142 may receive, from a second UE, an indication of a transmission on a sidelink resource from the second UE to the first UE. The communication manager 142 may receive, from the second UE, data on the sidelink resource based at least in part on the indication of the transmission. Additionally, or alternatively, the communication manager 142 may perform one or more other operations described herein.

As shown in FIG. 1, the BS 110a may include a communication manager 144. As described in more detail elsewhere herein, the communication manager 144 may receive, from a first UE, a request to activate a sidelink resource based at least in part on an indication of a transmission on the sidelink resource communicated between the first UE and a second UE. The communication manager 144 may transmit, to the first UE, a response indicating that the sidelink resource has been activated for sidelink communication between the first UE and the second UE. Additionally, or alternatively, the communication manager 144 may perform one or more other operations described herein.

As indicated above, FIG. 1 is provided merely as an example. Other examples may differ from what is described with regard to FIG. 1.

Figure 2:
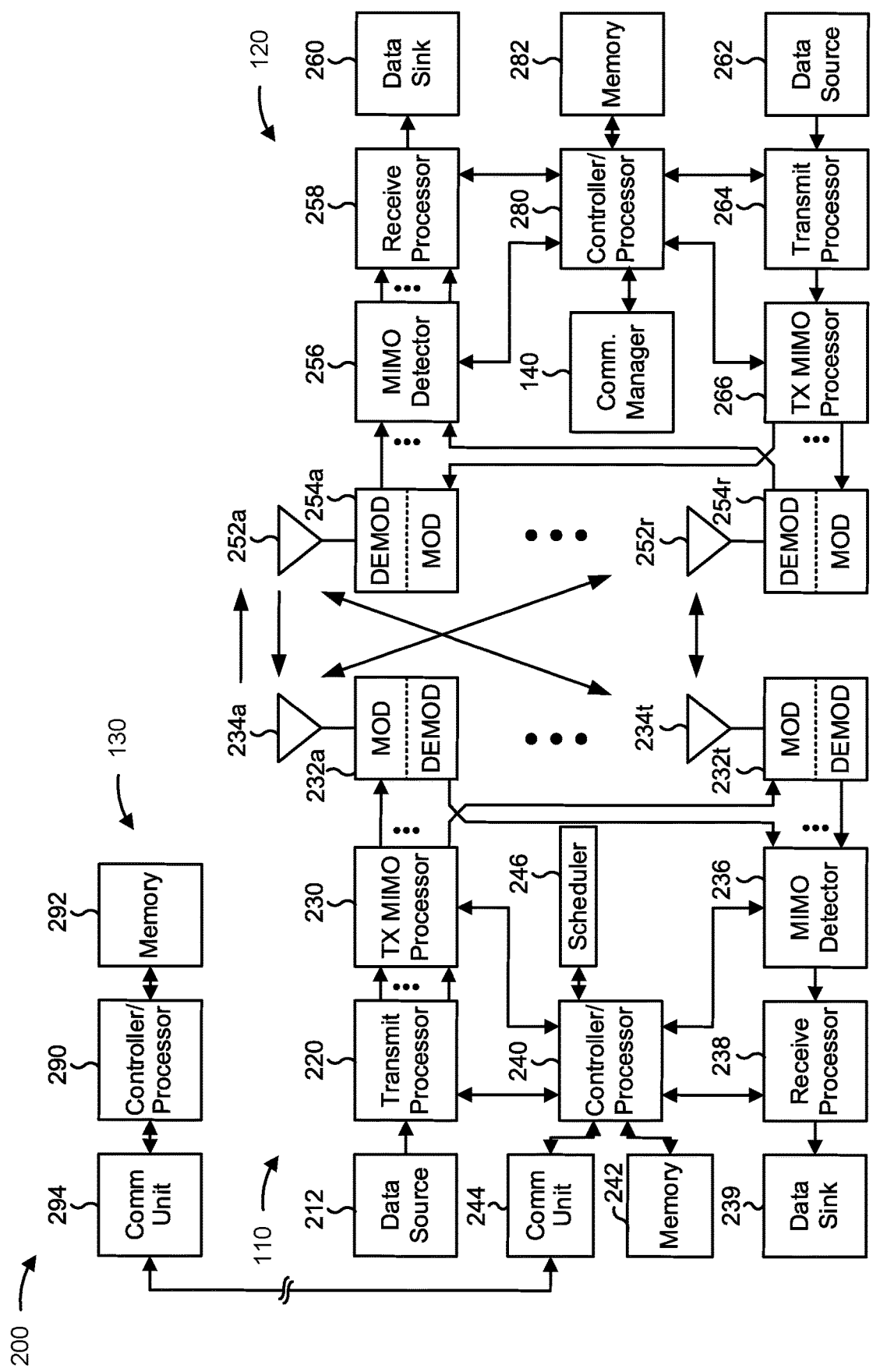
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports comprising RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, a first UE (e.g., the UE 120) may include means for transmitting (e.g., using controller/processor 280, transmit processor 264, TX MIMO processor 266, MOD 254, antenna 252, and/or the like), to a second UE, an indication of a transmission on a sidelink resource to the second UE, and means for transmitting (e.g., using controller/processor 280, transmit processor 264, TX MIMO processor 266, MOD 254, antenna 252, and/or the like), to the second UE, data on the sidelink resource based at least in part on the indication of the transmission.

In some aspects, a first UE (e.g., the UE 120) may include means for receiving (e.g., using antenna 252, DEMOD 254, MIMO detector 256, receive processor 258, controller/processor 280, and/or the like), from a second UE, an indication of a transmission on a sidelink resource from the second UE, means for receiving (e.g., using antenna 252, DEMOD 254, MIMO detector 256, receive processor 258, controller/processor 280, and/or the like), from the second UE, data on the sidelink resource based at least in part on the indication of the transmission, and/or the like.

Additionally, or alternatively, the UE 120 may include means for performing one or more other operations described herein. In some aspects, such means may include the communication manager 140. Additionally, or alternatively, such means may include one or more other components of the UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided merely as an example. Other examples may differ from what is described with regard to FIG. 2.

Figure 3:
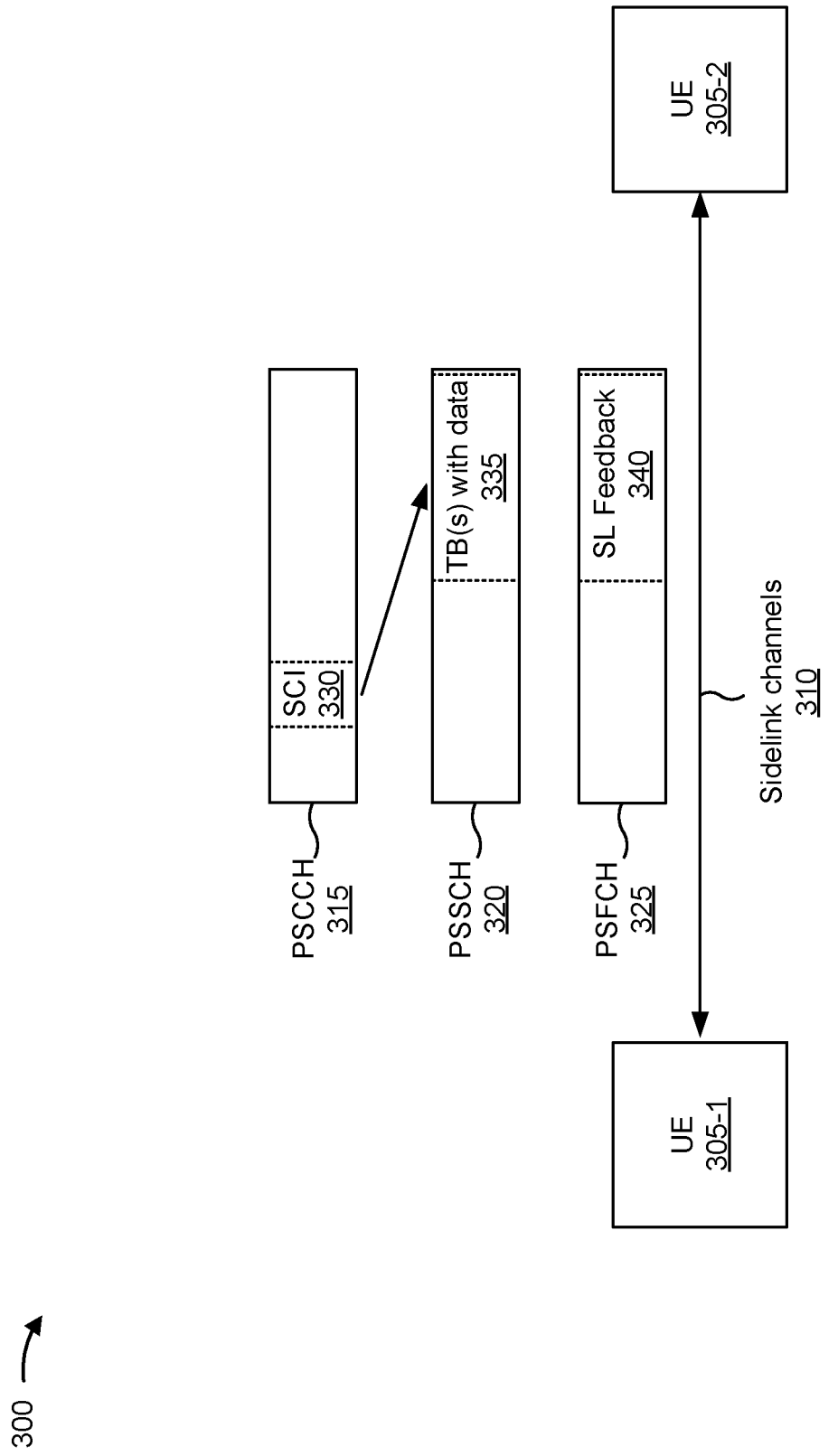
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, vehicle-to-person (V2P) communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a ProSe Sidelink (PC5) interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
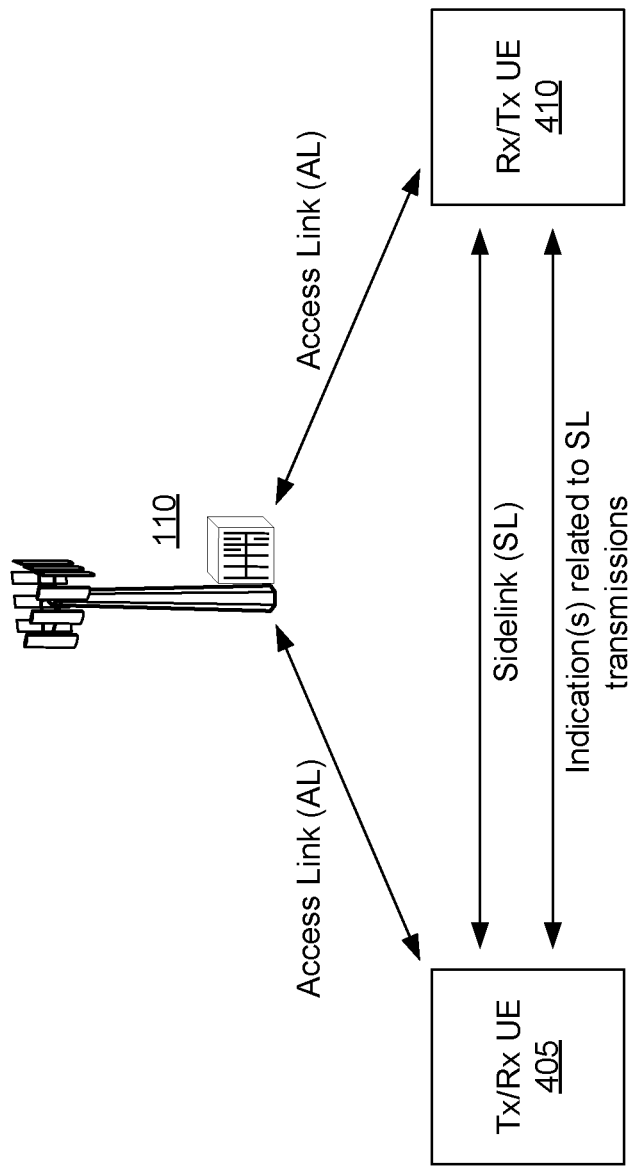
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications (which may include signaling of indications of sidelink transmissions) may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Sidelink resources may be allocated for sidelink transmissions between UEs. Sidelink resource allocation may be grouped into two separate modes. In a first mode (Mode 1), sidelink resources for sidelink transmissions may be dynamically scheduled by a base station. Alternatively, in the first mode, sidelink resources for sidelink transmissions may be semi-statically configured by the base station. In a second mode (Mode 2), sidelink resources for sidelink transmissions may be selected using sensing and reservation. For example, a UE may sense available sidelink resources and reserve an available sidelink resource for an upcoming sidelink transmission.

A first UE (e.g., a sidelink Tx UE) may transmit data to a second UE (e.g., a sidelink Rx UE) on a sidelink resource. In the first mode and the second mode of resource allocation, the second UE may monitor a plurality of sidelink resources (e.g., sub-channels) to receive the data over a PSCCH or PSSCH from the first UE. The second UE may consume power when monitoring the plurality of sidelink resources to receive the data over the PSCCH or PSSCH.

Figure 5:
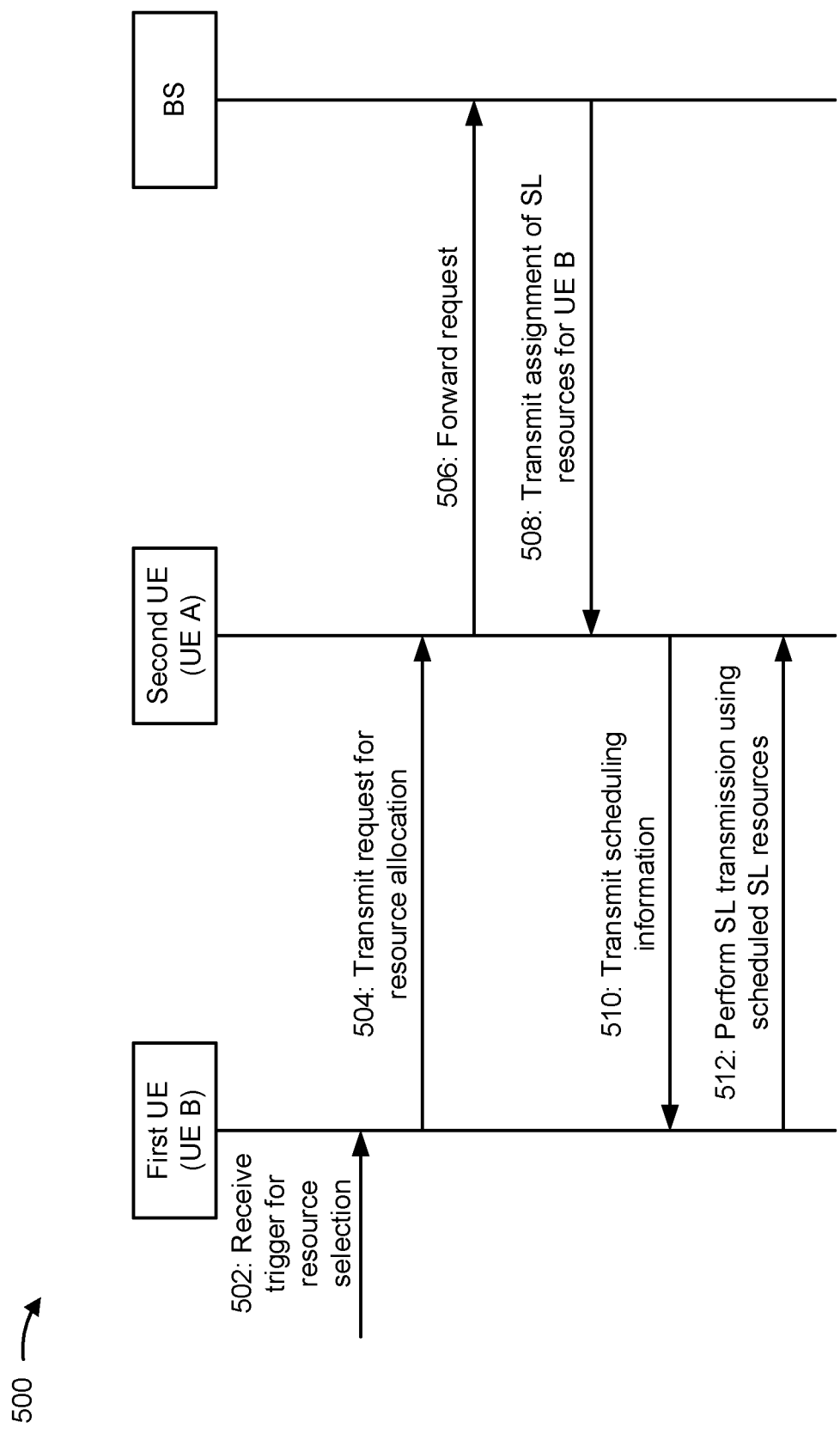
FIG. 5 is a diagram illustrating an example of a resource allocation for sidelink communications between UEs, in accordance with the present disclosure.

FIG. 5 is a diagram illustrating an example of a resource allocation for sidelink communications between UEs, in accordance with the present disclosure. As shown in FIG. 5, example 500 includes communication between a first UE (e.g., UE 120*a*), a second UE (e.g., UE 120*e*), and a base station (e.g., base station 110*a*). In some aspects, the first UE, the second UE, and the base station 110*a* may be included in a wireless network such as wireless network 100. The first UE, the second UE, and the base station may communicate on a wireless sidelink.

As shown by reference number 502, the first UE (UE B) may receive a trigger for sidelink resource selection. For example, the first UE may receive data to be transmitted using a sidelink resource. The first UE may be a wearable device, such as a head-mounted display, a smart watch, and/or the like.

As shown by reference number 504, the first UE may transmit a request for resource allocation to the second UE (UE A). In other words, the UE may request an allocation of sidelink resources from the second UE. The second UE may be a relay device, such as a mobile device that acts as a relay for the first UE.

As shown by reference number 506, the second UE may receive the request for resource allocation from the first UE. The second UE may forward the request for resource allocation to a base station.

As shown by reference number 508, the base station may receive the request for resource allocation from the second UE. The base station may assign sidelink resources for the first UE to perform sidelink transmissions. The base station may transmit, to the second UE, an assignment of sidelink resources for the first UE.

As shown by reference number 510, the second UE may receive, from the base station, the assignment of sidelink resources for the first UE. The second UE may forward the assignment of sidelink resources to the first UE. In other words, the second UE may transmit scheduling information to the first UE that indicates the assignment of sidelink resources for the first UE. Based on the scheduling information, the first UE may determine particular sidelink resources that have been scheduled or reserved for sidelink transmissions from the first UE.

As shown by reference number 512, the first UE may perform a sidelink transmission with the second UE using a scheduled sidelink resource. In other words, the first UE may perform the sidelink transmission with the second UE based at least in part on the scheduling information received from the second UE.

In one or more examples, the second UE may not forward the request for resource allocation to the base station, and the second UE may not receive the assignment of sidelink resources from the base station. Rather, the second UE may determine or assign the sidelink resources for the first UE, and transmit the assignment of sidelink resources to the first UE.

In one or more examples, the second UE may not act as a relay device, as data may be triggered and terminated at a PC5 interface. The second UE may be a source of data and/or a destination for data, such as when the first UE and/or the second UE are included in an IoT network.

As indicated above, FIG. 5 is provided as an example. Other examples may differ from what is described with respect to FIG. 5.

Sidelink resources may be configured for sidelink transmissions and receptions. The sidelink resources may include one or more sets of sidelink resources, where each set of sidelink resources may be associated with a sidelink configuration. The sidelink configuration may define a periodicity for corresponding sidelink resources, a time-domain allocation for the sidelink resources per occasion, a number of sub-channels and indices of the sub-channels per occasion, a sidelink resource pool associated with the sidelink configuration, a range of modulation and coding schemes to be used for sidelink transmissions, a number of layers to be used for sidelink transmissions, and/or the like. The sidelink resources associated with the sidelink configuration may be indicated to sidelink UEs as being available for transmissions, receptions, or both transmissions and receptions.

The sidelink configuration may be selected and indicated by a base station for a group of UEs. The sidelink configuration may be indicated by a relay UE (e.g., UE A), where the sidelink configuration may be selected by the base station and indicated to the relay UE, or the sidelink configuration may be selected at the relay UE. The sidelink configuration may be selected and negotiated by a group of users (e.g., UE A, UE B, and/or other UEs).

As an example, two sidelink resource configurations may be configured between a first UE and a second UE. The first UE may use the two sidelink resource configurations to transmit to and/or receive from the second UE, and vice versa.

As previously described, a first UE may transmit and/or receive data over a sidelink interface with a second UE. For example, the first UE may monitor a plurality of sidelink resources to successfully receive data from the second UE. Depending on a device type of the first UE, monitoring the plurality of sidelink resources may create an undue power burden at the first UE. For example, the first UE may be a wearable device, such as a head-mounted display, a smart watch, and/or the like, for which power efficient sidelink operation may be important for increased battery life.

The first UE may be aided by the second UE to communicate with a network. The second UE may be a mobile device acting as a relay for the first UE to communicate with the network. The second UE may also be a power sensitive device (e.g., the second UE may be a battery-powered mobile device). Due to power usage limitations at the first UE and/or the second UE, a resource allocation for sidelink operation that reduces power consumption may be beneficial to the first UE and/or the second UE.

In various aspects of techniques and apparatuses described herein, resource allocation between a first UE and a second UE may involve the first UE transmitting an indication of an upcoming transmission to the second UE. In other words, the indication may notify the second UE that a sidelink transmission is to occur from the first UE. The indication may further specify a configured sidelink resource to be used by the first UE to perform the sidelink transmission. The second UE may receive the indication and may or may not respond to the first UE. For example, the second UE may determine that the configured sidelink resource indicated by the first UE does not cause a collision with another sidelink transmission, and the second UE may notify the first UE that the configured sidelink resource is available for the first UE to use. The first UE may perform the sidelink transmission with the second UE using the configured sidelink resource, which was previously indicated from the first UE to the second UE.

By transmitting the indication of the upcoming sidelink transmission on the configured sidelink resource and later performing the sidelink transmission on the configured sidelink resource (assuming the second UE does not send a rejection in response to the indication received from the first UE), the first UE may not perform sensing and reservation of available sidelink resources, which may reduce power consumption at the first UE. The power savings may be beneficial when the first UE is a battery-powered wearable device, such as a head-mounted display, a smart watch, and/or the like. Additionally, by receiving the indication of the configured sidelink resource ahead of time (e.g., before the sidelink transmission occurs on the configured sidelink resource), the second UE may not monitor a plurality of sidelink resources to receive the sidelink transmission from the first UE, thereby saving power at the second UE.

Figure 6:
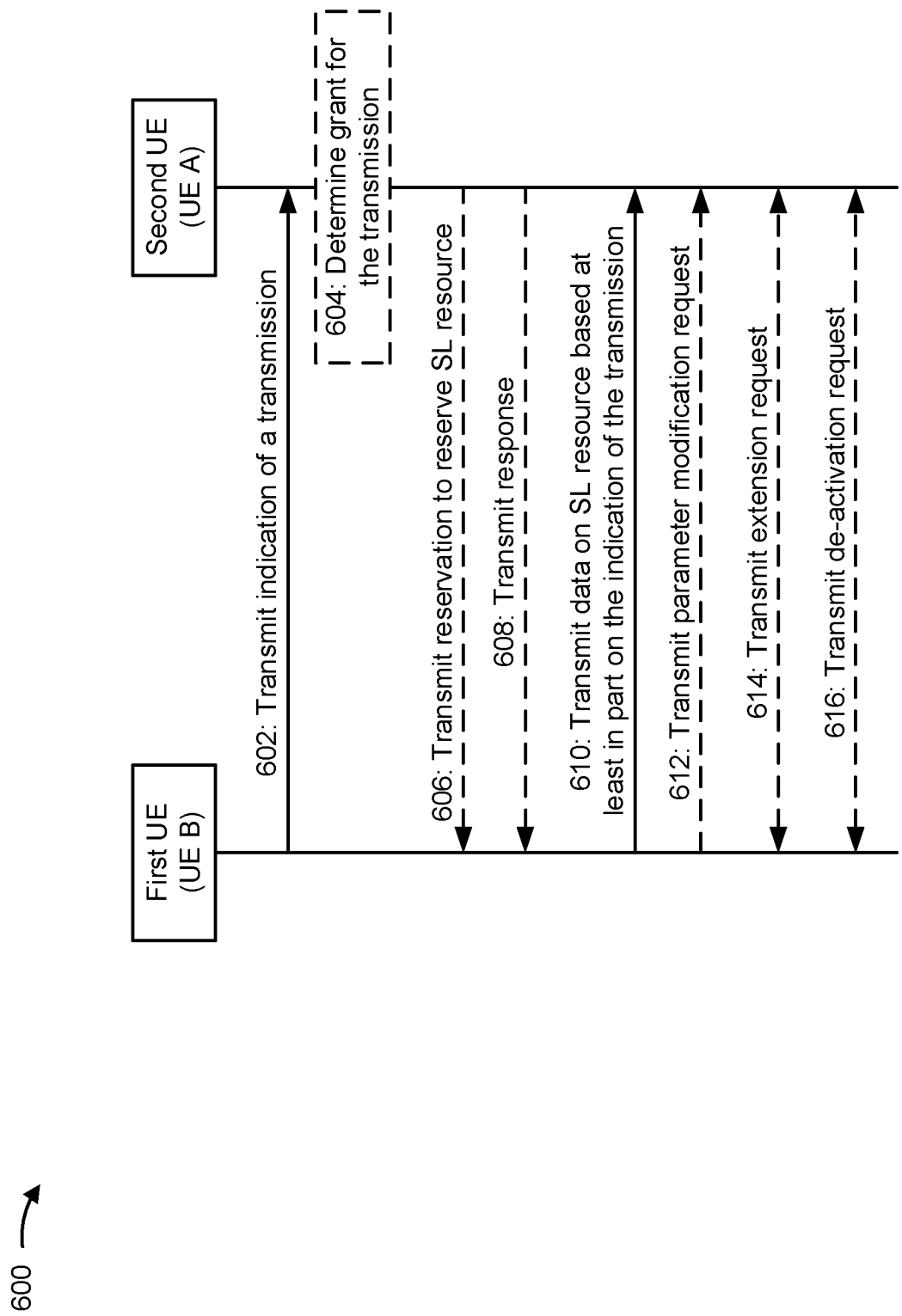
FIG. 6 is a diagram illustrating an example associated with signaling an indication of a sidelink transmission, in accordance with the present disclosure.

FIG. 6 is a diagram illustrating an example associated with signaling an indication of a sidelink transmission, in accordance with the present disclosure. As shown in FIG. 6, example 600 includes communication between a first UE (e.g., UE 120*a*) and a second UE (e.g., UE 120*e*). In some aspects, the first UE and the second UE may be included in a wireless network such as wireless network 100. The first UE and the second UE may communicate on a wireless sidelink. Dashed lines indicate optional steps.

As shown by reference number 602, the first UE (UE B) may transmit, to the second UE (UE A), an indication of a transmission on a sidelink resource from the first UE to the second UE. In other words, the indication may indicate an upcoming sidelink transmission from the first UE to the second UE using the sidelink resource. The indication transmitted by the first UE may activate the sidelink resource to carry the sidelink transmission to be performed later in time by the first UE. The sidelink resource may include one or more configured sidelink resources. By transmitting the indication, the first UE may notify the second UE of the upcoming sidelink transmission on a particular set of configured sidelink resources. In some aspects, the second UE may receive the indication of the transmission on the sidelink resource from the base station. In some aspects, the transmission on the sidelink resource may be from a device other than the first UE.

In one or more examples, the sidelink resource to be used for the sidelink transmission may be defined based at least in part on a slot index, a sub-channel, a cyclic shift, a sequence, and/or the like, and the sidelink resource may correspond to a unique sidelink resource configuration for sidelink transmissions. As an example, the sequence may be a pseudo-random sequence, such as a Gold sequence or a Zadoff-Chu sequence. Different initializations of the sequence may be mapped to different sidelink resource configurations, and the mapping may be indicated via RRC signaling.

In one or more examples, the indication may convey a single bit of information indicating that the first UE is to perform the sidelink transmission with the second UE using the sidelink resource.

In one or more examples, the indication may include additional information relating to the sidelink transmission to be performed between the first UE and the second UE. For example, the indication may include an index of the sidelink resource and/or a sidelink resource pool. For example, the indication may include indices of a configured sidelink resource or a subset of configured sidelink resources, where the sidelink resource(s) are included in one or more sidelink resource pools. The indication may specify one or more sidelink component carriers to be used by the first UE to perform the sidelink transmission with the second UE. The indication may be transmitted from the first UE to the second UE on a PSCCH or a PSSCH. The indication may be transmitted from the first UE to the second UE using SCI-1, SCI-2, or a MAC-CE. The indication may be transmitted from the first UE to the second UE using a pseudo-random sequence.

As shown by reference number 604, the second UE may receive the indication from the first UE. The second UE may determine whether to grant the first UE use of the indicated sidelink resource for the sidelink transmission. In some aspects, the second UE may determine whether to grant the first UE use of the sidelink resource based at least in part on signaling with a base station. For example, the second UE may transmit a request for the sidelink resource to the base station based at least in part on the indication received from the first UE. The base station may determine whether to grant use of the sidelink resource. In other words, the base station may determine whether to activate the sidelink resource for the first UE. The second UE may receive, from the base station, the grant (or no grant) of the sidelink resource.

In one or more examples, the second UE may determine whether to grant the first UE use of the sidelink resource without signaling with the base station. For example, the second UE may determine whether to grant use of the sidelink resource to the first UE based at least in part on transmissions and receptions of the first UE with other UEs, such as a third UE. The transmissions and receptions with the other UEs may or may not overlap with the sidelink resource indicated by the first UE.

As shown by reference number 606, the second UE may transmit a reservation in a PSCCH or a PSSCH to reserve the sidelink resource indicated by the first UE. For example, the second UE may determine to grant the first UE use of the sidelink resource, and the second UE may transmit the reservation so that other UEs do not use the sidelink resource indicated by the first UE for their own sidelink transmissions. The second UE may transmit the reservation in a periodic manner or in an aperiodic manner.

As shown by reference number 608, the second UE may transmit a response granting the first UE use of the sidelink resource. For example, after the second UE receives the grant from the base station, reserves the sidelink resource by transmitting the reservation in the PSCCH or the PSSCH, and/or the like, the second UE may transmit the response to the first UE. Alternatively, the second UE may transmit a response not granting the first UE use of the sidelink resource.

As shown by reference number 610, the first UE may receive the response from the second UE. The first UE may perform the sidelink transmission with the second UE on the sidelink resource. In other words, the first UE (or another device) may transmit data to the second UE on the sidelink resource based at least in part on the response received from the second UE. A transmission of the indication to the second UE and a transmission of the data to the second UE may be separated by a predefined time gap, and a receipt of the response from the second UE and the transmission of the data to the second UE may be separated by a different predefined time gap. The predefined time gaps may allow the first UE and/or the second UE sufficient processing time between signals. The data may include, for example, a control transmission, a data transmission, a reference signal transmission, and/or one or more other forms of transmission.

In one or more examples, the first UE may transmit the indication to the second UE, and the second UE may not send the response to the first UE. The first UE may perform the sidelink transmission after sending the indication, without receiving the response from the second UE. The indication that is transmitted to the second UE may be considered to be a wakeup signal for the second UE. In other words, after receipt of the indication, the second UE may be able to receive the sidelink transmission from the first UE on the sidelink resource, where the sidelink resource may be associated with a predefined set of sidelink resource configurations.

As shown by reference number 612, the first UE may transmit, to the second UE, a signal to modify a parameter associated with the sidelink resource. The sidelink resource may be associated with an activated sidelink resource configuration, and the signal transmitted by the first UE may serve to modify a parameter associated with the activated sidelink resource configuration.

As shown by reference number 614, the first UE may transmit, to the second UE, a request to extend a duration of an activation of the sidelink resource, where the sidelink resource may be associated with one or more activated sidelink resource configurations. The first UE may receive, from the second UE, a grant to extend the duration of the activation of the sidelink resource. Alternatively, the second UE may extend the duration of the activation of the sidelink resource, without receiving the request from the first UE.

In one or more examples, the first UE may transmit the duration of the activation of the sidelink resource as part of the indication transmitted to the second UE. In other words, the indication may specify a duration of time that the activated sidelink resource configuration(s) are to remain active for use by the first UE. The second UE may or may not transmit an acknowledgement to the first UE. The acknowledgement may indicate whether an activation time is extended or not.

In one or more examples, the second UE may transmit the duration of the activation of the sidelink resource as part of the response transmitted to the first UE. The duration may be determined at the second UE, or the duration may be determined at the base station and signaled from the base station to the second UE.

In one or more examples, the first UE may not be configured to transmit on the sidelink resource after the activation of the sidelink resource expires. In other words, after the activation of the sidelink resource expires, the first UE may be unable to transmit on the sidelink resource associated with the one or more activated sidelink resource configurations.

As shown by reference number 616, the first UE may transmit, to the second UE, an indication to deactivate the sidelink resource. In other words, the first UE may transmit the indication to deactivate the one or more activated sidelink resource configurations associated with the sidelink resource. The first UE may transmit the indication to deactivate the sidelink resource when the first UE does not have additional data to transmit to the second UE. Alternatively, the second UE may transmit the indication to deactivate the sidelink resource to the first UE. For example, the second UE may transmit the indication to deactivate the sidelink resource when the second UE is unable to receive additional data from the first UE. The second UE may be unable to receive additional data from the first UE when the second UE is a relay device for the first UE, but the second UE may serve other UEs and/or may not have sufficient power or resources to receive additional data from the first UE.

In one or more examples, the first UE may transmit an indication to deactivate sidelink configured resources in a joint manner. For example, the first UE may transmit the indication to deactivate multiple sidelink configured resources at a same time. Alternatively, the first UE may transmit an indication to deactivate sidelink configured resources in a separate manner. For example, the first UE may transmit a separate indication to deactivate each sidelink configuration independently.

In one or more examples, the indication to deactivate the sidelink resource may be transmitted from the base station directly to the first UE. Alternatively, the indication to deactivate the sidelink resource may be transmitted from the base station to the second UE, and the second UE may relay the indication to the first UE.

In one or more examples, the signaling between the first UE and the second UE may be reversed, as compared to the description above. For example, the second UE may receive the indication from the first UE. The first UE may determine whether to grant the second UE use of the sidelink resource. The first UE may transmit a reservation for the sidelink resource. The first UE may transmit a response to the second UE. The second UE may transmit data on the sidelink resource to the first UE. The second UE may perform other transmissions as described above, such as transmissions to modify a sidelink resource parameter, requests to extend a duration of the sidelink resource, requests to deactivate the sidelink resource, and/or the like.

As indicated above, FIG. 6 is provided as an example. Other examples may differ from what is described with respect to FIG. 6.

Figure 7:
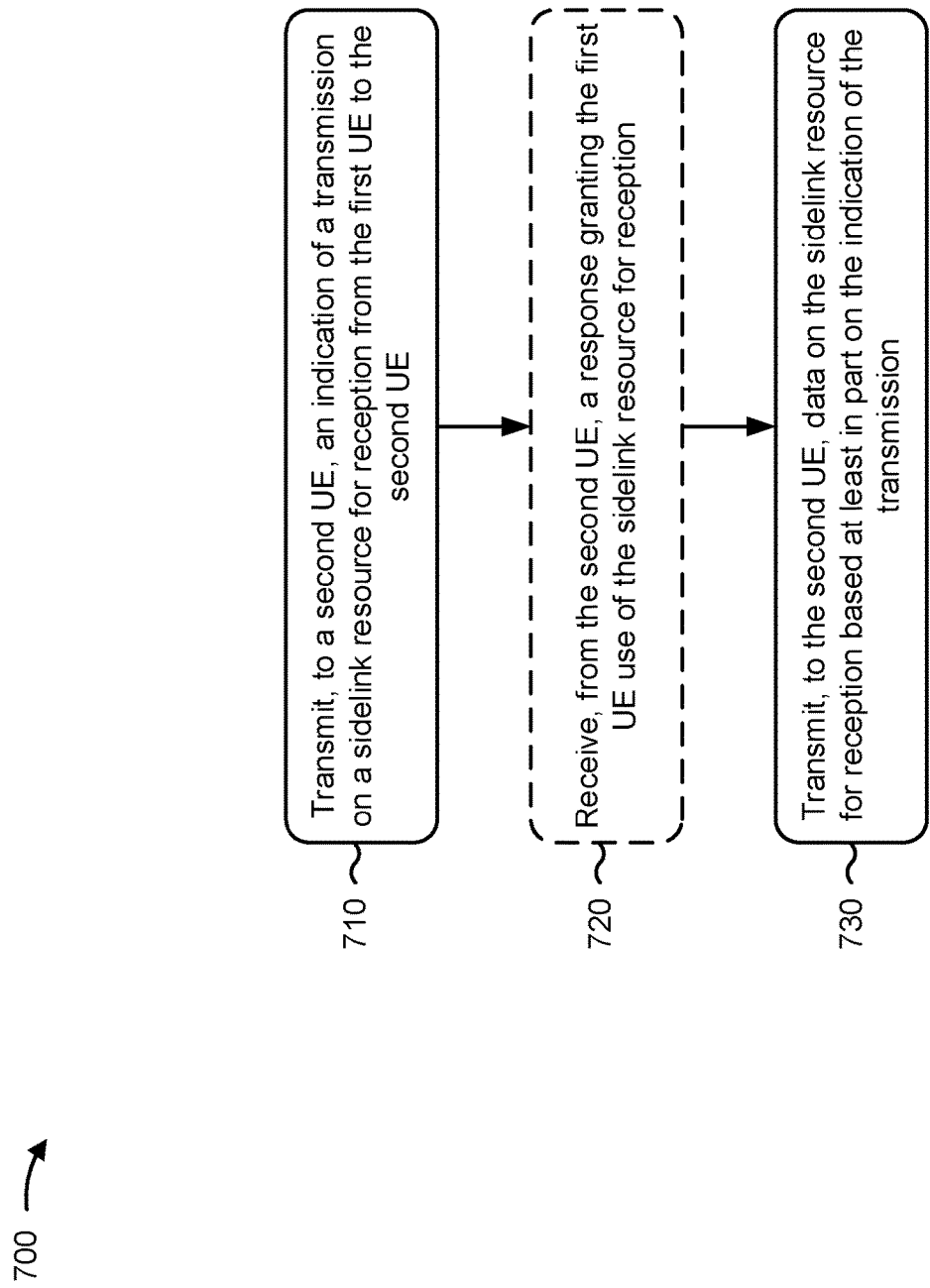
FIGS. 7-8 are diagrams illustrating example processes associated with signaling an indication of a sidelink transmission, in accordance with the present disclosure.

FIG. 7 is a diagram illustrating an example process 700 performed, for example, by a first UE, in accordance with the present disclosure. Example process 700 is an example where the first UE (e.g., UE 120) performs operations associated with signaling an indication of a sidelink transmission. Dashed blocks indicate optional steps. It should be noted that an example of the first UE of FIG. 7 is UE B of FIG. 6, and an example of the second UE of FIG. 7 is UE A of FIG. 6.

As shown in FIG. 7, in some aspects, process 700 may include transmitting, to a second UE, an indication of a transmission on a sidelink resource for reception from the first UE to the second UE (block 710). For example, the first UE (e.g., using antenna 252, transmit processor 264, TX MIMO processor 266, modulator 254, controller/processor 280, and/or memory 282) may transmit, to a second UE, an indication of a transmission on a sidelink resource for reception. The transmission may be from the first UE to the second UE, as described above.

As further shown in FIG. 7, in some aspects, process 700 may include receiving, from the second UE, a response granting the first UE use of the sidelink resource for reception (block 720). For example, the first UE (e.g., using antenna 252, transmit processor 264, TX MIMO processor 266, modulator 254, controller/processor 280, and/or memory 282) may receive, from the second UE, a response granting the first UE use of the sidelink resource for reception, as described above.

As further shown in FIG. 7, in some aspects, process 700 may include transmitting, to the second UE, data on the sidelink resource for reception based at least in part on the indication of the transmission (block 730). For example, the first UE (e.g., using antenna 252, transmit processor 264, TX MIMO processor 266, modulator 254, controller/processor 280, and/or memory 282) may transmit, to the second UE, data on the sidelink resource for reception based at least in part on the indication of the transmission, as described above.

Process 700 may include additional aspects, such as any single aspect or any combination of aspects described below and/or in connection with one or more other processes described elsewhere herein.

In a first aspect, the sidelink resource for reception includes one or more configured sidelink resources. An indication of the configured sidelink resources may be received from a base station or a relay UE.

In a second aspect, alone or in combination with the first aspect, the indication is transmitted to the second UE before data that is transmitted on the sidelink resource for reception from the first UE to the second UE.

In a third aspect, alone or in combination with one or more of the first and second aspects, the indication transmitted to the second UE is to activate the sidelink resource for reception to carry the data transmitted from the first UE to the second UE.

In a fourth aspect, alone or in combination with one or more of the first through third aspects, the indication includes an index of the sidelink resource for reception, wherein the sidelink resource for reception is included in a configured sidelink resource configuration.

In a fifth aspect, alone or in combination with one or more of the first through fourth aspects, the indication specifies one or more of a sidelink component carrier or a sidelink resource pool to be used by the first UE to transmit the data on the sidelink resource for reception to the second UE.

In a sixth aspect, alone or in combination with one or more of the first through fifth aspects, transmitting the indication comprises transmitting the indication in sidelink control information on a sidelink control channel.

In a seventh aspect, alone or in combination with one or more of the first through sixth aspects, transmitting the indication comprises transmitting the indication on a sidelink shared channel or transmitting the indication via a media access control (MAC) control element (CE).

In an eighth aspect, alone or in combination with one or more of the first through seventh aspects, transmitting the indication comprises transmitting the indication using a pseudo-random sequence.

In a ninth aspect, alone or in combination with one or more of the first through eighth aspects, a transmission of the indication to the second UE and a transmission of the data to the second UE is separated by a predefined time gap.

In a tenth aspect, alone or in combination with one or more of the first through ninth aspects, the data is transmitted on the sidelink resource for reception based at least in part on the response received from the second UE.

In an eleventh aspect, alone or in combination with one or more of the first through tenth aspects, a receipt of the response from the second UE and a transmission of the data to the second UE is separated by a predefined time gap.

In a twelfth aspect, alone or in combination with one or more of the first through eleventh aspects, process 700 includes transmitting, to the second UE, a signal to modify a parameter associated with the sidelink resource for reception.

In a thirteenth aspect, alone or in combination with one or more of the first through twelfth aspects, the indication includes a duration of an activation of the sidelink resource for reception.

In a fourteenth aspect, alone or in combination with one or more of the first through thirteenth aspects, the first UE is not allowed to transmit on the sidelink resource for reception after the activation of the sidelink resource for reception expires.

In a fifteenth aspect, alone or in combination with one or more of the first through fourteenth aspects, process 700 includes transmitting a request to extend the duration of the activation of the sidelink resource for reception, and receiving, from the second UE, a grant to extend the duration of the activation of the sidelink resource for reception.

In a sixteenth aspect, alone or in combination with one or more of the first through fifteenth aspects, process 700 includes transmitting, to the second UE, an indication to deactivate the sidelink resource for reception.

In a seventeenth aspect, alone or in combination with one or more of the first through sixteenth aspects, the sidelink resource for reception is deactivated using PC5-radio resource control (RRC) signaling between the first UE and the second UE, wherein deactivation of the sidelink resource for reception involves a modification to one or more parameters including an activation time.

In an eighteenth aspect, alone or in combination with one or more of the first through sixteenth aspects, process 700 includes receiving, from a base station, an indication to deactivate the sidelink resource for reception.

In a nineteenth aspect, alone or in combination with one or more of the first through seventeenth aspects, process 700 includes receiving, from a base station via the second UE, a second indication to deactivate the sidelink resource for reception.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
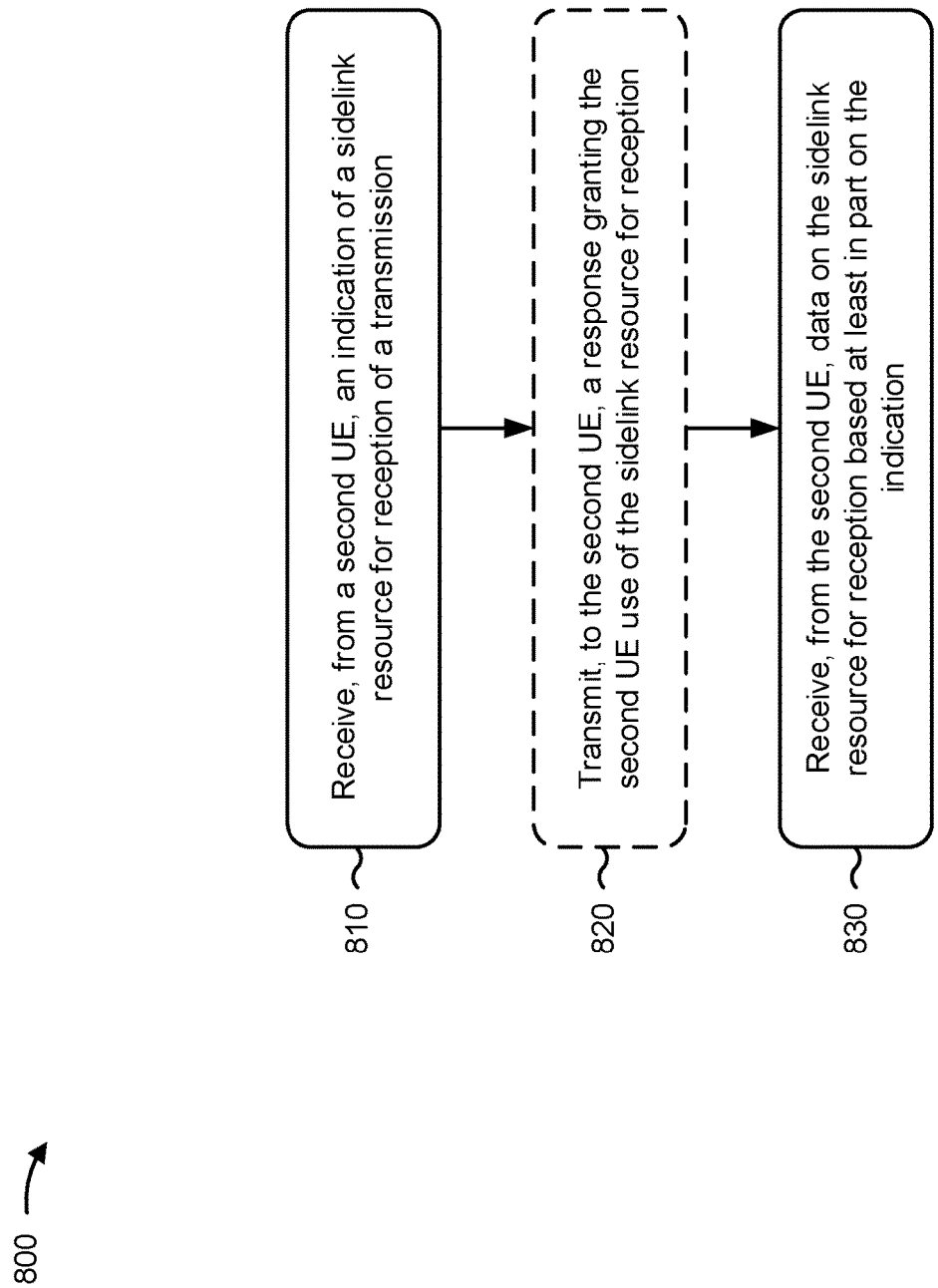

FIG. 8 is a diagram illustrating an example process 800 performed, for example, by a first UE, in accordance with the present disclosure. Example process 800 is an example where the first UE (e.g., UE 120) performs operations associated with signaling an indication of a sidelink transmission. Dashed blocks indicate optional steps. It should be noted that an example of the first UE of FIG. 8 is UE A of FIG. 6, and an example of the second UE of FIG. 8 is UE B of FIG. 6. In other words, the first UE and the second UE are reversed, in example process 800, relative to example process 700.

As shown in FIG. 8, in some aspects, process 800 may include receiving an indication of a sidelink resource for reception of a transmission (block 810). For example, the first UE (e.g., using antenna 252, demodulator 254, MIMO detector 256, receive processor 258, controller/processor 280, and/or memory 282) may receive an indication of a sidelink resource for reception of a transmission, as described above. In some aspects, the indication may be of the transmission (e.g., in addition to or as an alternative to the underlying sidelink resource for reception).

As further shown in FIG. 8, in some aspects, process 800 may include transmitting, to the second UE, a response granting the second UE use of the sidelink resource for reception (block 820). For example, the first UE (e.g., using antenna 252, demodulator 254, MIMO detector 256, receive processor 258, controller/processor 280, and/or memory 282) may transmit, to the second UE, a response granting the second UE use of the sidelink resource for reception, as described above.

As further shown in FIG. 8, in some aspects, process 800 may include receiving data on the sidelink resource for reception based at least in part on the indication (block 830). For example, the first UE (e.g., using antenna 252, demodulator 254, MIMO detector 256, receive processor 258, controller/processor 280, and/or memory 282) may receive, from the second UE, data on the sidelink resource for reception based at least in part on the indication of the transmission, as described above.

Process 800 may include additional aspects, such as any single aspect or any combination of aspects described below and/or in connection with one or more other processes described elsewhere herein.

In a first aspect, the sidelink resource for reception includes one or more configured sidelink resources.

In a second aspect, alone or in combination with the first aspect, the indication is received from the second UE before data that is received on the sidelink resource for reception from the second UE.

In a third aspect, alone or in combination with one or more of the first and second aspects, the indication activates the sidelink resource for reception to carry the data received from the second UE.

In a fourth aspect, alone or in combination with one or more of the first through third aspects, the indication includes an index of the sidelink resource for reception, wherein the sidelink resource for reception is included in a configured sidelink resource configuration.

In a fifth aspect, alone or in combination with one or more of the first through fourth aspects, the indication specifies one or more of a sidelink component carrier or a sidelink resource pool to be used to transmit the data on the sidelink resource for reception.

In a sixth aspect, alone or in combination with one or more of the first through fifth aspects, receiving the indication comprises receiving the indication in sidelink control information on a sidelink control channel.

In a seventh aspect, alone or in combination with one or more of the first through sixth aspects, receiving the indication comprises receiving the indication on a sidelink shared channel or receiving the indication via a media access control (MAC) control element (CE).

In an eighth aspect, alone or in combination with one or more of the first through seventh aspects, receiving the indication comprises receiving the indication using a pseudo-random sequence.

In a ninth aspect, alone or in combination with one or more of the first through eighth aspects, a receipt of the indication from the second UE and a receipt of the data from the second UE is separated by a predefined time gap.

In a tenth aspect, alone or in combination with one or more of the first through ninth aspects, process 800 includes transmitting, to the second UE, a response not granting the second UE use of the sidelink resource for reception.

In an eleventh aspect, alone or in combination with one or more of the first through tenth aspects, data is received on the sidelink resource for reception based at least in part on the response transmitted to the second UE.

In a twelfth aspect, alone or in combination with one or more of the first through eleventh aspects, a transmission of the response to the second UE and a receipt of the data from the second UE is separated by a predefined time gap.

In a thirteenth aspect, alone or in combination with one or more of the first through twelfth aspects, process 800 includes transmitting, to a base station, a request for the sidelink resource for reception, and receiving, from the base station, a grant of the sidelink resource for reception, and the response granting the second UE use of the sidelink resource for reception is transmitted to the second UE based at least in part on the grant of the sidelink resource for reception received from the base station.

In a fourteenth aspect, alone or in combination with one or more of the first through thirteenth aspects, process 800 includes determining to grant the second UE use of the sidelink resource for reception.

In a fifteenth aspect, alone or in combination with one or more of the first through fourteenth aspects, process 800 includes transmitting a reservation in a sidelink control channel to reserve the sidelink resource for reception based at least in part on the indication received from the second UE, and the response granting the second UE use of the sidelink resource for reception is transmitted to the second UE after the sidelink resource for reception is reserved by the first UE.

In a sixteenth aspect, alone or in combination with one or more of the first through fifteenth aspects, process 800 includes transmitting a reservation in a sidelink shared channel to reserve the sidelink resource for reception based at least in part on the indication received from the second UE, and the response granting the second UE use of the sidelink resource for reception is transmitted to the second UE after the sidelink resource for reception is reserved by the first UE.

In a seventeenth aspect, alone or in combination with one or more of the first through sixteenth aspects, the indication includes a duration of an activation of the sidelink resource for reception.

In an eighteenth aspect, alone or in combination with one or more of the first through seventeenth aspects, process 800 includes receiving, from the second UE, a request to extend the duration of the activation of the sidelink resource for reception, and transmitting, to the second UE, a grant to extend the duration of the activation of the sidelink resource for reception.

In a nineteenth aspect, alone or in combination with one or more of the first through eighteenth aspects, process 800 includes transmitting, to the second UE, an indication to deactivate the sidelink resource for reception.

In a twentieth aspect, alone or in combination with one or more of the first through nineteenth aspects, process 800 includes receiving, from a base station, an indication to deactivate the sidelink resource for reception, and transmitting, to the second UE, the indication to deactivate the sidelink resource for reception.

In a twenty-first aspect, alone or in combination with one or more of the first through nineteenth aspects, the sidelink resource for reception is deactivated using PC5-radio resource control (RRC) signaling between the first UE and the second UE, wherein deactivation of the sidelink resource for reception involves a modification to one or more parameters including an activation time.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
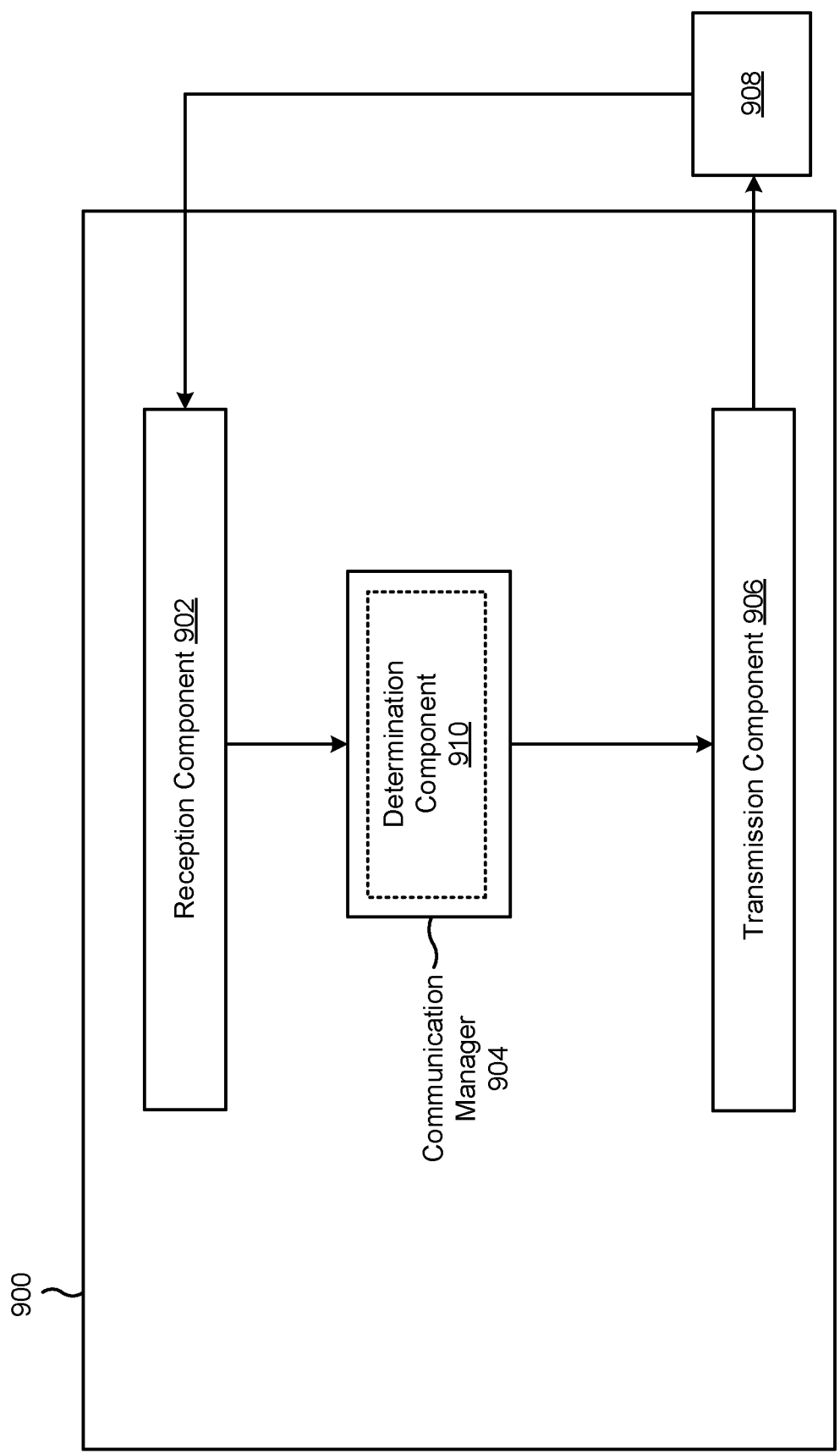
FIG. 9 is a block diagram of an example apparatus for wireless communication, in accordance with the present disclosure.

FIG. 9 is a block diagram of an example apparatus 900 for wireless communication in accordance with the present disclosure. The apparatus 900 may be a first UE, or a first UE may include the apparatus 900. In some aspects, the apparatus 900 includes a reception component 902, a communication manager 904, and a transmission component 906, which may be in communication with one another (for example, via one or more buses). As shown, the apparatus 900 may communicate with another apparatus 908 (such as a second UE, a base station, or another wireless communication device) using the reception component 902 and the transmission component 906.

In some aspects, the apparatus 900 may be configured to perform one or more operations described herein in connection with FIG. 9. Additionally or alternatively, the apparatus 900 may be configured to perform one or more processes described herein, such as process 700 of FIG. 7, process 800 of FIG. 8, or a combination thereof. In some aspects, the apparatus 900 may include one or more components of the first UE described above in connection with FIG. 2.

The reception component 902 may receive communications, such as reference signals, control information, data communications, or a combination thereof, from the apparatus 908. The reception component 902 may provide received communications to one or more other components of the apparatus 900, such as the communication manager 904. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the first UE described above in connection with FIG. 2.

The transmission component 906 may transmit communications, such as reference signals, control information, data communications, or a combination thereof, to the apparatus 908. In some aspects, the communication manager 904 may generate communications and may transmit the generated communications to the transmission component 906 for transmission to the apparatus 908. In some aspects, the transmission component 906 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 906 may include one or more antennas, a modulator, a transmit MIMO processor, a transmit processor, a controller/processor, a memory, or a combination thereof, of the first UE described above in connection with FIG. 2. In some aspects, the transmission component 906 may be co-located with the reception component 902 in a transceiver.

In some aspects, the communication manager 904 may provide means for transmitting, to a second UE, an indication of a transmission on a sidelink resource from the first UE to the second UE; and means for transmitting, to the second UE, data on the sidelink resource for reception based at least in part on the indication of the transmission.

In some aspects, the communication manager 904 may provide means for receiving, from a second UE, an indication of a transmission on a sidelink resource from the second UE to the first UE; and means for receiving, from the second UE, data on the sidelink resource for reception based at least in part on the indication of the transmission.

In some aspects, the communication manager 904 may include a controller/processor, a memory, or a combination thereof, of the first UE described above in connection with FIG. 2.

In some aspects, the communication manager 904 may include a set of components, such as a determination component 910. Alternatively, the set of components may be separate and distinct from the communication manager 904.

In some aspects, the communication manager 904 and/or one or more components of the set of components may include or may be implemented within hardware (e.g., one or more of the circuitry components described in connection with FIG. 11). In some aspects, the communication manager 904 and/or one or more components of the set of components may include or may be implemented within a controller/processor, a memory, or a combination thereof, of the UE 120 described above in connection with FIG. 2.

In some aspects, the communication manager 904 and/or one or more components of the set of components may be implemented in code (e.g., as software or firmware stored in a memory), such as the code described in connection with FIG. 11. For example, the communication manager 904 and/or a component (or a portion of a component) may be implemented as instructions or code stored in a non-transitory computer-readable medium and executable by a controller or a processor to perform the functions or operations of the communication manager 904 and/or the component. If implemented in code, the functions of the communication manager 904 and/or a component may be executed by a controller/processor, a memory, a scheduler, a communication unit, or a combination thereof, of the UE 120 described above in connection with FIG. 2.

In some aspects, the reception component 902 may provide means for receiving, from the second UE, a response granting the first UE use of the sidelink resource for reception.

In some aspects, the transmission component 906 may provide means for transmitting, to the second UE, a signal to modify a parameter associated with the sidelink resource for reception.

In some aspects, the transmission component 906 may provide means for transmitting a request to extend the duration of the activation of the sidelink resource for reception. The reception component 902 may provide means for receiving, from the second UE, a grant to extend the duration of the activation of the sidelink resource for reception.

In some aspects, the transmission component 906 may provide means for transmitting, to the second UE, an indication to deactivate the sidelink resource for reception.

In some aspects, the reception component 902 may provide means for receiving, from a base station, an indication to deactivate the sidelink resource for reception.

In some aspects, the reception component 902 may provide means for receiving, from a base station via the second UE, a second indication to deactivate the sidelink resource for reception.

In some aspects, the transmission component 906 may provide means for transmitting, to the second UE, a response not granting the second UE use of the sidelink resource for reception.

In some aspects, the transmission component 906 may provide means for transmitting, to the second UE, a response granting the second UE use of the sidelink resource for reception.

In some aspects, the transmission component 906 may provide means for transmitting, to a base station, a request for the sidelink resource for reception. The reception component 902 may provide means for receiving, from the base station, a grant of the sidelink resource for reception.

In some aspects, the determination component 910 may provide means for determining to grant the second UE use of the sidelink resource for reception.

In some aspects, the transmission component 906 may provide means for transmitting a reservation in a sidelink control channel to reserve the sidelink resource for reception based at least in part on the indication received from the second UE.

In some aspects, the transmission component 906 may provide means for transmitting a reservation in a sidelink shared channel to reserve the sidelink resource for reception based at least in part on the indication received from the second UE.

In some aspects, the reception component 902 may provide means for receiving, from the second UE, a request to extend the duration of the activation of the sidelink resource for reception. The transmission component 906 may provide means for transmitting, to the second UE, a grant to extend the duration of the activation of the sidelink resource for reception.

In some aspects, the transmission component 906 may provide means for transmitting, to the second UE, an indication to deactivate the sidelink resource for reception.

In some aspects, the reception component 902 may provide means for receiving, from a base station, an indication to deactivate the sidelink resource for reception. The transmission component 906 may provide means for transmitting, to the second UE, the indication to deactivate the sidelink resource for reception.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
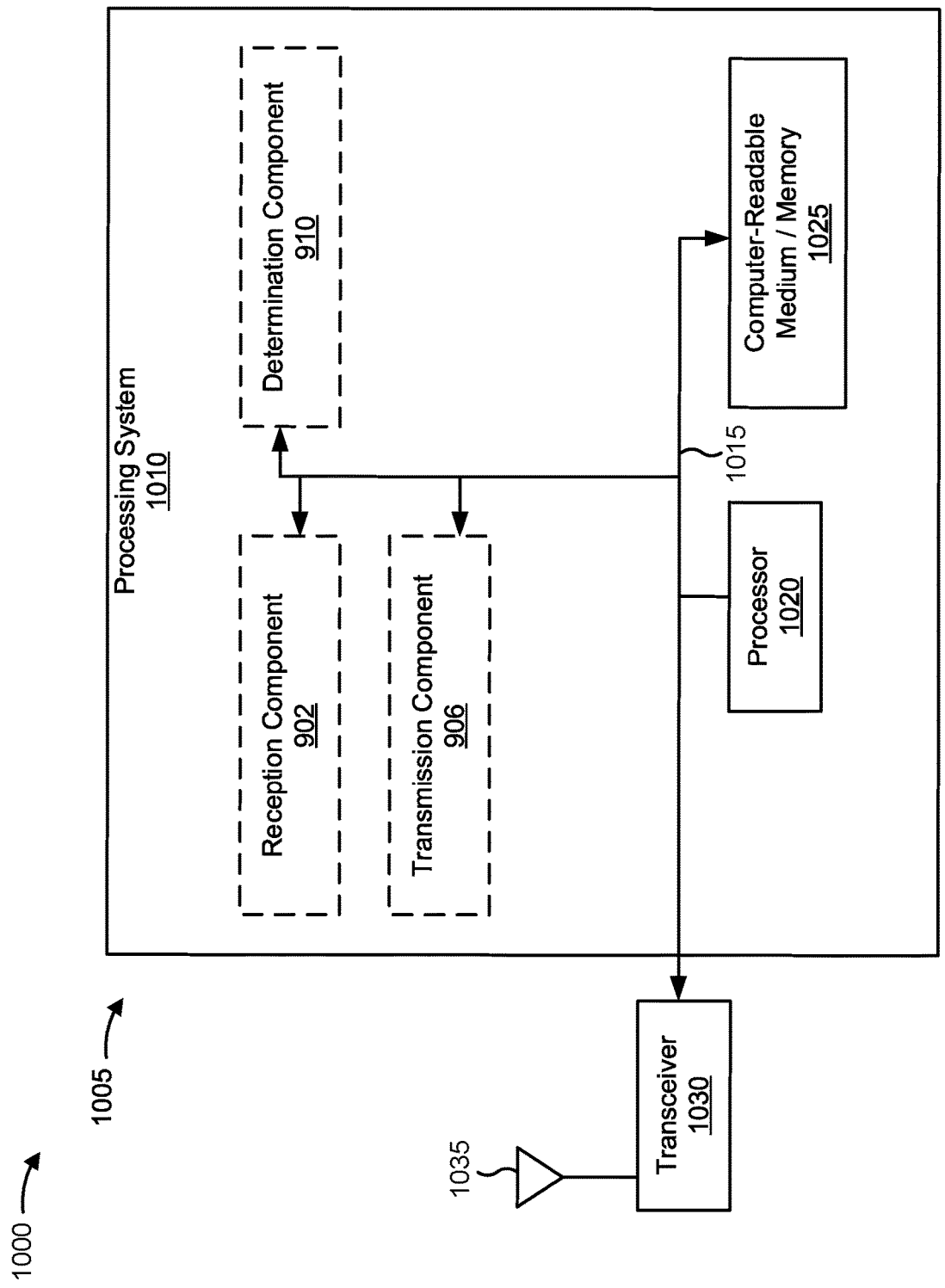
FIG. 10 is a diagram illustrating an example of a hardware implementation for an apparatus employing a processing system, in accordance with the present disclosure.

FIG. 10 is a diagram illustrating an example 1000 of a hardware implementation for an apparatus 1005 employing a processing system 1010. The apparatus 1005 may be a first UE.

The processing system 1010 may be implemented with a bus architecture, represented generally by the bus 1015. The bus 1015 may include any number of interconnecting buses and bridges depending on the specific application of the processing system 1010 and the overall design constraints. The bus 1015 links together various circuits including one or more processors and/or hardware components, represented by the processor 1020, the illustrated components, and the computer-readable medium/memory 1025. The bus 1015 may also link various other circuits, such as timing sources, peripherals, voltage regulators, power management circuits, and/or the like.

The processing system 1010 may be coupled to a transceiver 1030. The transceiver 1030 is coupled to one or more antennas 1035. The transceiver 1030 provides a means for communicating with various other apparatuses over a transmission medium. The transceiver 1030 receives a signal from the one or more antennas 1035, extracts information from the received signal, and provides the extracted information to the processing system 1010, specifically the reception component 902. In addition, the transceiver 1030 receives information from the processing system 1010, specifically the transmission component 906, and generates a signal to be applied to the one or more antennas 1035 based at least in part on the received information.

The processing system 1010 includes a processor 1020 coupled to a computer-readable medium/memory 1025. The processor 1020 is responsible for general processing, including the execution of software stored on the computer-readable medium/memory 1025. The software, when executed by the processor 1020, causes the processing system 1010 to perform the various functions described herein for any particular apparatus. The computer-readable medium/memory 1025 may also be used for storing data that is manipulated by the processor 1020 when executing software. The processing system further includes at least one of the illustrated components. The components may be software modules running in the processor 1020, resident/stored in the computer readable medium/memory 1025, one or more hardware modules coupled to the processor 1020, or some combination thereof.

In some aspects, the processing system 1010 may be a component of the UE 120 and may include the memory 282 and/or at least one of the TX MIMO processor 266, the RX processor 258, and/or the controller/processor 280.

In some aspects, the apparatus 1005 for wireless communication includes means for transmitting, to a second UE, an indication of a transmission on a sidelink resource to the second UE; and means for transmitting, to the second UE, data on the sidelink resource for reception based at least in part on the indication of the transmission.

In some aspects, the apparatus 1005 for wireless communication includes means for receiving, from a second UE, an indication of a transmission on a sidelink resource from the second UE; and means for receiving, from the second UE, data on the sidelink resource for reception based at least in part on the indication of the transmission.

The aforementioned means may be one or more of the aforementioned components of the apparatus 900 and/or the processing system 1010 of the apparatus 1005 configured to perform the functions recited by the aforementioned means. As described elsewhere herein, the processing system 1010 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 10 is provided as an example. Other examples may differ from what is described in connection with FIG. 10.

Figure 11:
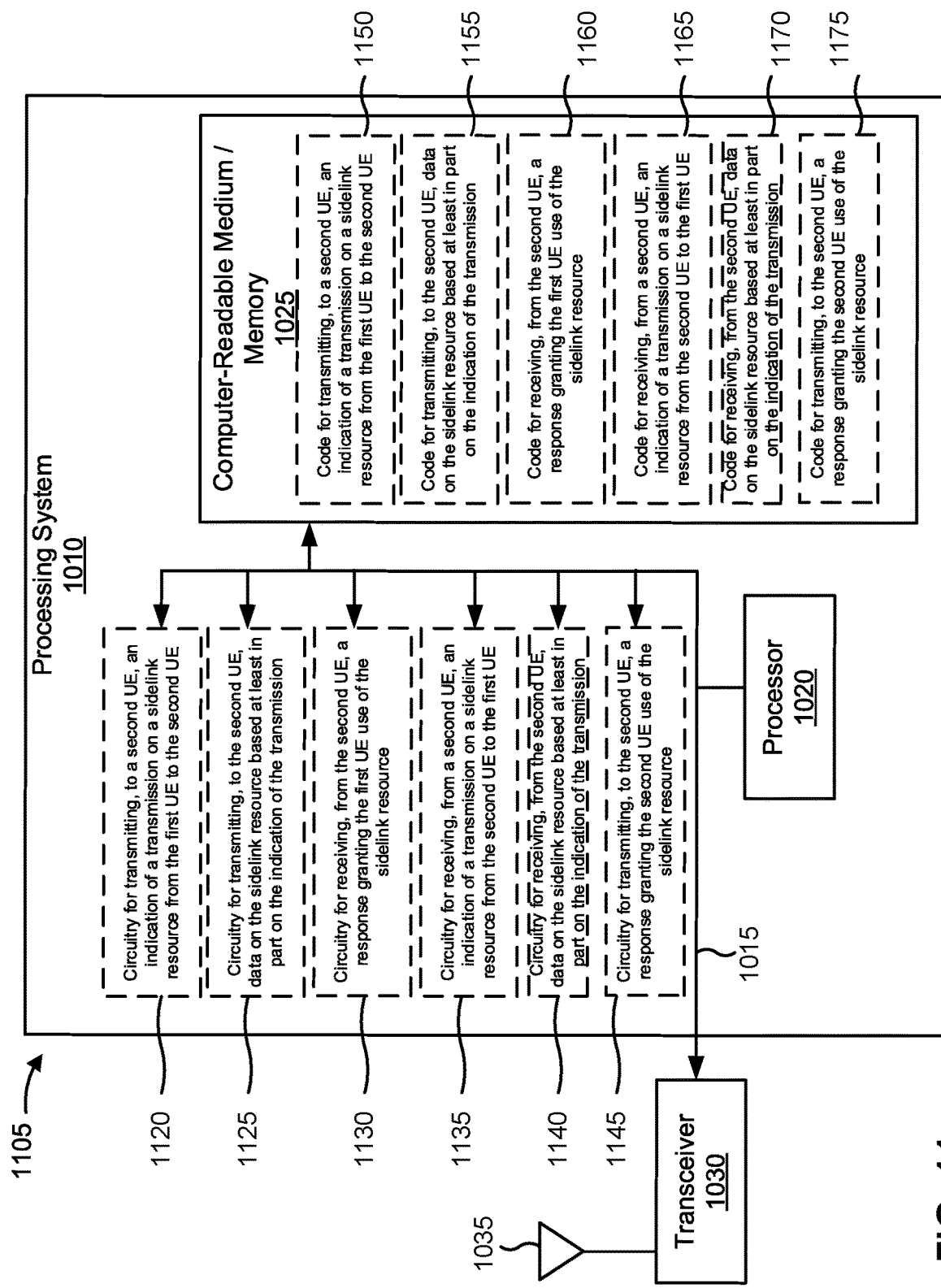
FIG. 11 is a diagram illustrating an example of an implementation of code and circuitry for an apparatus, in accordance with the present disclosure.

FIG. 11 is a diagram illustrating an example 1100 of an implementation of code and circuitry for an apparatus 1105. The apparatus 1105 may be a UE (e.g., a first UE).

As further shown in FIG. 11, the apparatus may include circuitry for transmitting, to a second UE, an indication of a transmission on a sidelink resource from the first UE to the second UE (circuitry 1120). For example, the apparatus may include circuitry to enable the apparatus to transmit, to a second UE, an indication of a transmission on a sidelink resource from the first UE to the second UE.

As further shown in FIG. 11, the apparatus may include circuitry for transmitting, to the second UE, data on the sidelink resource for reception based at least in part on the indication of the transmission (circuitry 1125). For example, the apparatus may include circuitry to enable the apparatus to transmit, to the second UE, data on the sidelink resource for reception based at least in part on the indication of the transmission.

As further shown in FIG. 11, the apparatus may include circuitry for receiving, from the second UE, a response granting the first UE use of the sidelink resource for reception (circuitry 1130). For example, the apparatus may include circuitry to enable the apparatus to receive, from the second UE, a response granting the first UE use of the sidelink resource for reception.

As further shown in FIG. 11, the apparatus may include circuitry for receiving, from a second UE, an indication of a transmission on a sidelink resource from the second UE to the first UE (circuitry 1135). For example, the apparatus may include circuitry to enable the apparatus to receive, from a second UE, an indication of a transmission on a sidelink resource from the second UE to the first UE.

As further shown in FIG. 11, the apparatus may include circuitry for receiving, from the second UE, data on the sidelink resource for reception based at least in part on the indication of the transmission (circuitry 1140). For example, the apparatus may include circuitry to enable the apparatus to receive, from the second UE, data on the sidelink resource for reception based at least in part on the indication of the transmission.

As further shown in FIG. 11, the apparatus may include circuitry for transmitting, to the second UE, a response granting the second UE use of the sidelink resource for reception (circuitry 1145). For example, the apparatus may include circuitry to enable the apparatus to transmit, to the second UE, a response granting the second UE use of the sidelink resource for reception.

As further shown in FIG. 11, the apparatus may include, stored in computer-readable medium 1025, code for transmitting, to a second UE, an indication of a transmission on a sidelink resource from the first UE to the second UE (code 1150). For example, the apparatus may include code that, when executed by the processor 1020, may cause the transceiver 1030 to transmit, to a second UE, an indication of a transmission on a sidelink resource from the first UE to the second UE.

As further shown in FIG. 11, the apparatus may include, stored in computer-readable medium 1025, code for transmitting, to the second UE, data on the sidelink resource for reception based at least in part on the indication of the transmission (code 1155). For example, the apparatus may include code that, when executed by the processor 1020, may cause the transceiver 1030 to transmit, to the second UE, data on the sidelink resource for reception based at least in part on the indication of the transmission.

As further shown in FIG. 11, the apparatus may include, stored in computer-readable medium 1025, code for receiving, from the second UE, a response granting the first UE use of the sidelink resource for reception (code 1160). For example, the apparatus may include code that, when executed by the processor 1020, may cause the processor 1020 to receive, from the second UE, a response granting the first UE use of the sidelink resource for reception.

As further shown in FIG. 11, the apparatus may include, stored in computer-readable medium 1025, code for receiving, from a second UE, an indication of a transmission on a sidelink resource from the second UE to the first UE (code 1165). For example, the apparatus may include code that, when executed by the processor 1020, may cause the processor 1020 to receive, from a second UE, an indication of a transmission on a sidelink resource from the second UE to the first UE.

As further shown in FIG. 11, the apparatus may include, stored in computer-readable medium 1025, code for receiving, from the second UE, data on the sidelink resource for reception based at least in part on the indication of the transmission (code 1170). For example, the apparatus may include code that, when executed by the processor 1020, may cause the processor 1020 to receive, from the second UE, data on the sidelink resource for reception based at least in part on the indication of the transmission.

As further shown in FIG. 11, the apparatus may include, stored in computer-readable medium 1025, code for transmitting, to the second UE, a response granting the second UE use of the sidelink resource for reception (code 1175). For example, the apparatus may include code that, when executed by the processor 1020, may cause the transceiver 1030 to transmit, to the second UE, a response granting the second UE use of the sidelink resource for reception.

FIG. 11 is provided as an example. Other examples may differ from what is described in connection with FIG. 11.

Figure 12:
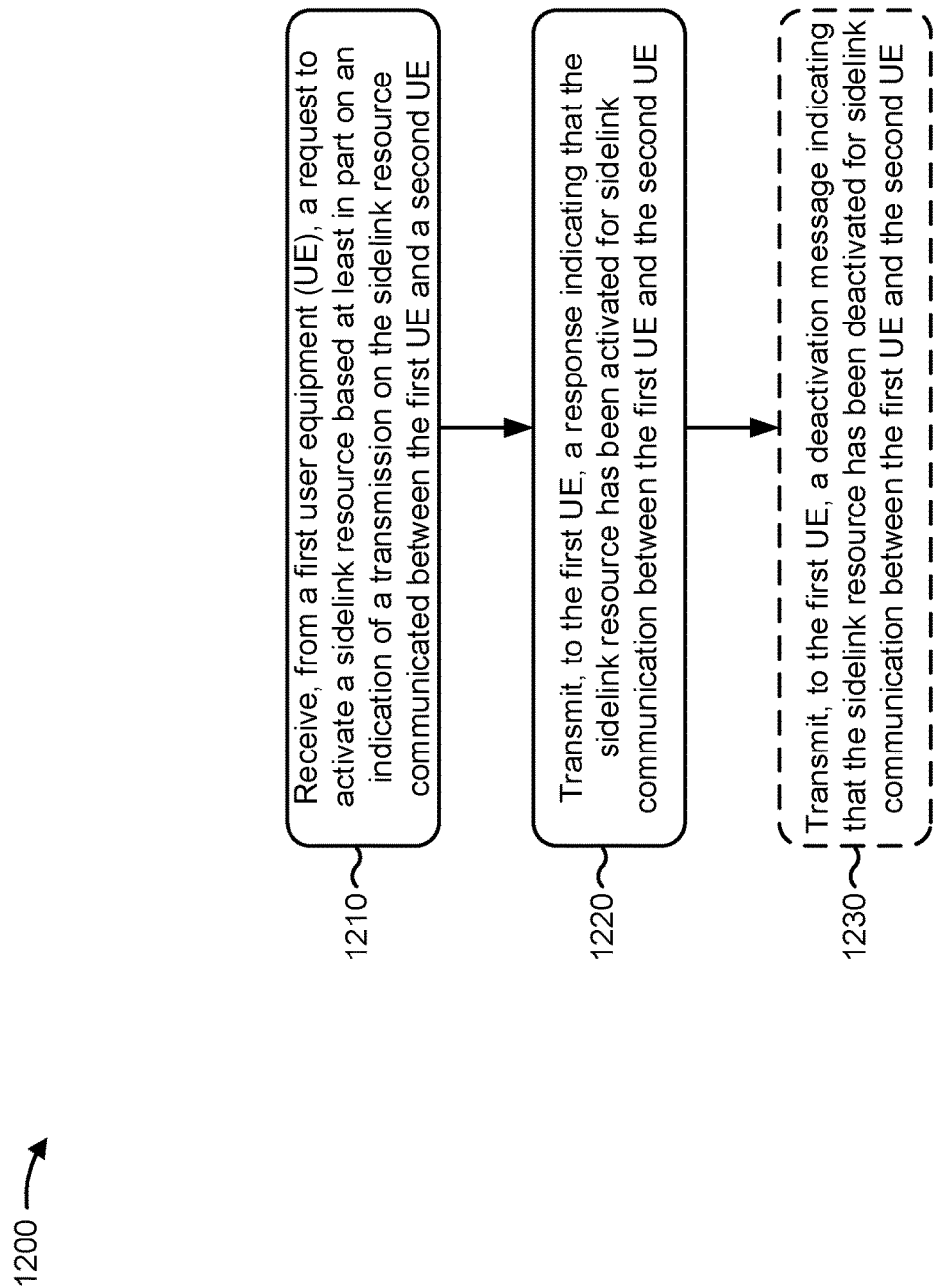
FIG. 12 is a diagram illustrating an example process associated with signaling an indication of a sidelink transmission, in accordance with the present disclosure.

FIG. 12 is a diagram illustrating an example process 1200 performed, for example, by a base station, in accordance with the present disclosure. Example process 1200 is an example where the base station (e.g., base station 110) performs operations associated with signaling an indication of a sidelink transmission.

As shown in FIG. 12, in some aspects, process 1200 may include receiving, from a first UE, a request to activate a sidelink resource based at least in part on an indication of a transmission on the sidelink resource for reception communicated between the first UE and a second UE (block 1210). For example, the base station (e.g., using reception component 1302, depicted in FIG. 13) may receive, from a first UE, a request to activate a sidelink resource based at least in part on an indication of a transmission on the sidelink resource for reception communicated between the first UE and a second UE, as described above.

As further shown in FIG. 12, in some aspects, process 1200 may include transmitting, to the first UE, a response indicating that the sidelink resource for reception has been activated for sidelink communication between the first UE and the second UE (block 1220). For example, the base station (e.g., using transmission component 1306, depicted in FIG. 13) may transmit, to the first UE, a response indicating that the sidelink resource for reception has been activated for sidelink communication between the first UE and the second UE, as described above.

Process 1200 may include additional aspects, such as any single aspect or any combination of aspects described below and/or in connection with one or more other processes described elsewhere herein.

In some aspects, process 1200 includes transmitting, to the first UE, a deactivation message indicating that the sidelink resource for reception has been deactivated for sidelink communication between the first UE and the second UE (block 1230).

In a first aspect, alone or in combination with the first aspect, process 1200 includes determining a duration for an activation of the sidelink resource for reception, and transmitting an indication of the duration to the first UE.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
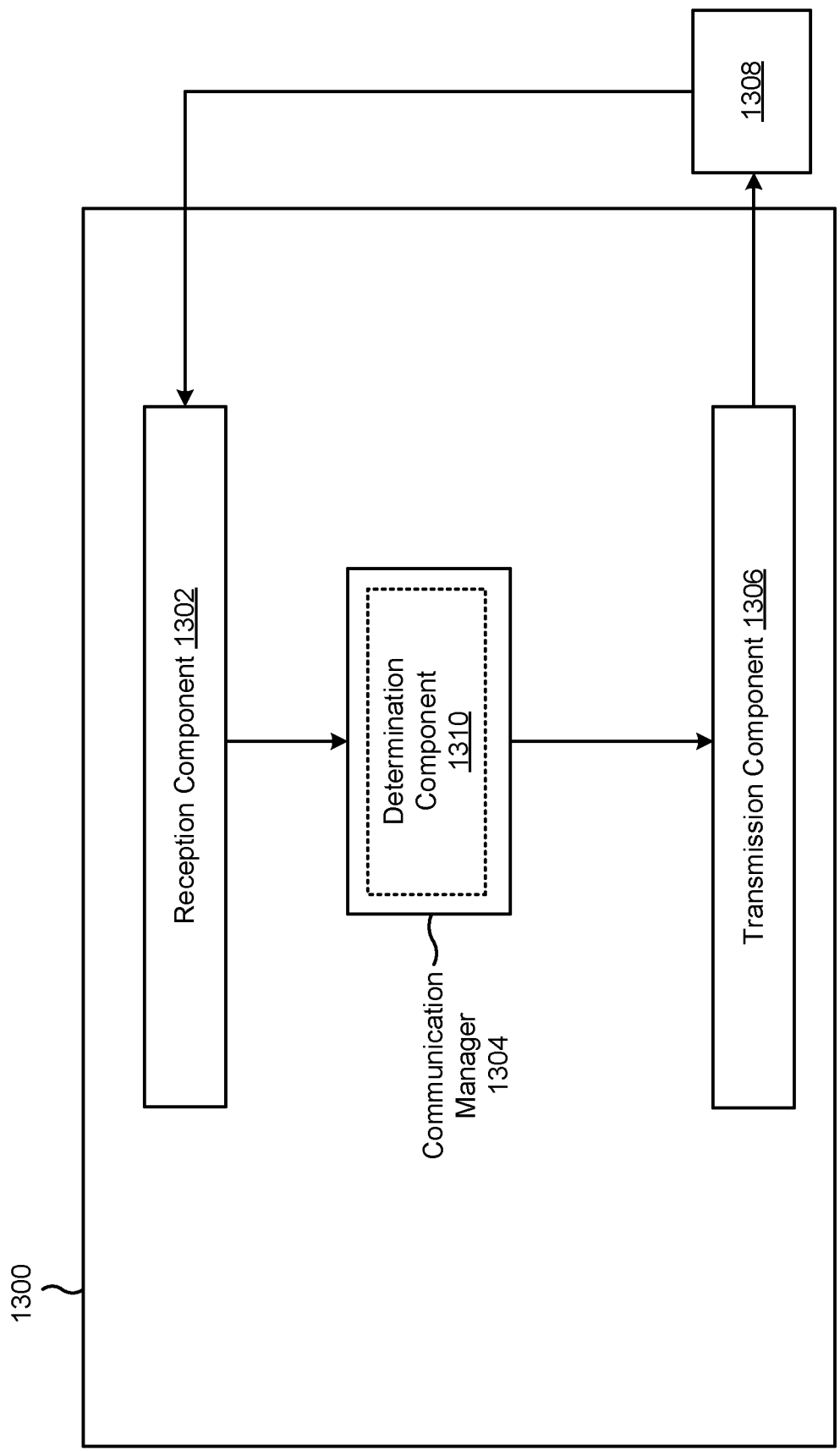
FIG. 13 is a block diagram of an example apparatus for wireless communication, in accordance with the present disclosure.

FIG. 13 is a block diagram of an example apparatus 1300 for wireless communication in accordance with the present disclosure. The apparatus 1300 may be a base station, or a base station may include the apparatus 1300. In some aspects, the apparatus 1300 includes a reception component 1302, a communication manager 1304, and a transmission component 1306, which may be in communication with one another (for example, via one or more buses). As shown, the apparatus 1300 may communicate with another apparatus 1308 (such as a first UE, a second UE, or another wireless communication device) using the reception component 1302 and the transmission component 1306.

In some aspects, the apparatus 1300 may be configured to perform one or more operations described herein in connection with FIG. 13. Additionally or alternatively, the apparatus 1300 may be configured to perform one or more processes described herein, such as process 1200 of FIG. 12. In some aspects, the apparatus 1300 may include one or more components of the base station described above in connection with FIG. 2.

The reception component 1302 may receive communications, such as reference signals, control information, data communications, or a combination thereof, from the apparatus 1308. The reception component 1302 may provide received communications to one or more other components of the apparatus 1300, such as the communication manager 1304. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1302 may include one or more antennas, a demodulator, a MIMO detector, a receive processor, a controller/processor, a memory, or a combination thereof, of the base station described above in connection with FIG. 2.

The transmission component 1306 may transmit communications, such as reference signals, control information, data communications, or a combination thereof, to the apparatus 1308. In some aspects, the communication manager 1304 may generate communications and may transmit the generated communications to the transmission component 1306 for transmission to the apparatus 1308. In some aspects, the transmission component 1306 may perform signal processing on the generated communications (such as filtering, amplification, modulation, digital-to-analog conversion, multiplexing, interleaving, mapping, or encoding, among other examples), and may transmit the processed signals to the apparatus 1308. In some aspects, the transmission component 1306 may include one or more antennas, a modulator, a transmit MIMO processor, a transmit processor, a controller/processor, a memory, or a combination thereof, of the base station described above in connection with FIG. 2. In some aspects, the transmission component 1306 may be co-located with the reception component 1302 in a transceiver.

In some aspects, the communication manager 1304 may include a set of components, such as a determination component 1310. Alternatively, the set of components may be separate and distinct from the communication manager 1304.

In some aspects, the reception component 1302 may provide means for receiving, from a first UE, a request to activate a sidelink resource based at least in part on an indication of a transmission on the sidelink resource for reception communicated between the first UE and a second UE. The transmission component 1306 may provide means for transmitting, to the first UE, a response indicating that the sidelink resource for reception has been activated for sidelink communication between the first UE and the second UE.

In some aspects, the transmission component 1306 may provide means for transmitting, to the first UE, a deactivation message indicating that the sidelink resource for reception has been deactivated for sidelink communication between the first UE and the second UE.

In some aspects, the determination component 1310 may provide means for determining a duration for an activation of the sidelink resource for reception; and transmitting an indication of the duration to the first UE. The transmission component 1306 may provide means for transmitting an indication of the duration to the first UE.

In some aspects, the communication manager 1304 may include a controller/processor, a memory, or a combination thereof, of the base station described above in connection with FIG. 2.

In some aspects, the communication manager 1304 and/or one or more components of the set of components may include or may be implemented within hardware (e.g., one or more of the circuitry components described in connection with FIG. 15). In some aspects, the communication manager 1304 and/or one or more components of the set of components may include or may be implemented within a controller/processor, a memory, or a combination thereof, of the UE 120 described above in connection with FIG. 2.

In some aspects, the communication manager 1304 and/or one or more components of the set of components may be implemented in code (e.g., as software or firmware stored in a memory), such as the code described in connection with FIG. 15. For example, the communication manager 1304 and/or a component (or a portion of a component) may be implemented as instructions or code stored in a non-transitory computer-readable medium and executable by a controller or a processor to perform the functions or operations of the communication manager 1304 and/or the component. If implemented in code, the functions of the communication manager 1304 and/or a component may be executed by a controller/processor, a memory, a scheduler, a communication unit, or a combination thereof, of the base station described above in connection with FIG. 2.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

Figure 14:
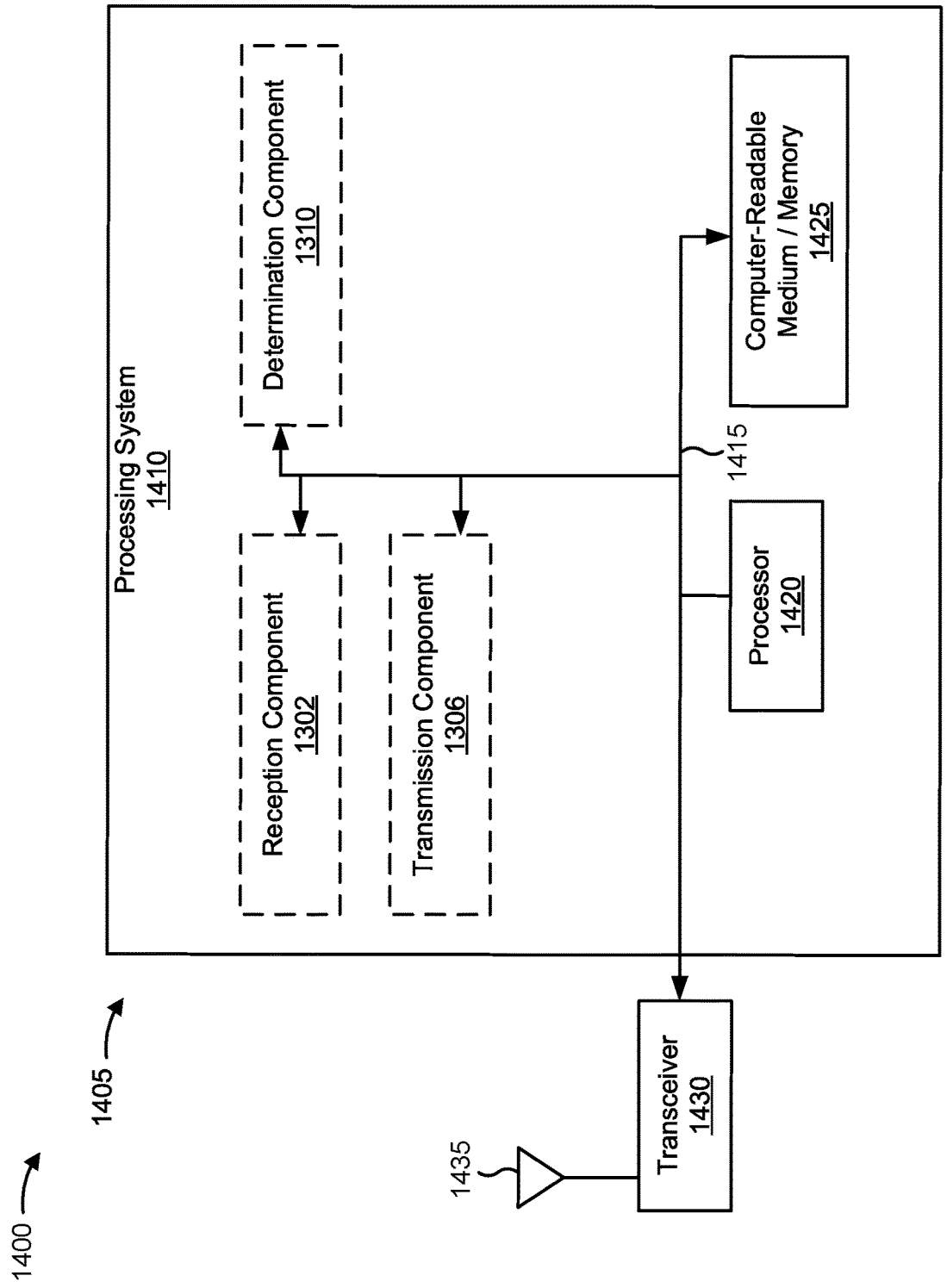
FIG. 14 is a diagram illustrating an example of a hardware implementation for an apparatus employing a processing system, in accordance with the present disclosure.

FIG. 14 is a diagram illustrating an example 1400 of a hardware implementation for an apparatus 1405 employing a processing system 1410. The apparatus 1405 may be a base station.

The processing system 1410 may be implemented with a bus architecture, represented generally by the bus 1415. The bus 1415 may include any number of interconnecting buses and bridges depending on the specific application of the processing system 1410 and the overall design constraints. The bus 1415 links together various circuits including one or more processors and/or hardware components, represented by the processor 1420, the illustrated components, and the computer-readable medium/memory 1425. The bus 1415 may also link various other circuits, such as timing sources, peripherals, voltage regulators, power management circuits, and/or the like.

The processing system 1410 may be coupled to a transceiver 1430. The transceiver 1430 is coupled to one or more antennas 1435. The transceiver 1430 provides a means for communicating with various other apparatuses over a transmission medium. The transceiver 1430 receives a signal from the one or more antennas 1435, extracts information from the received signal, and provides the extracted information to the processing system 1410, specifically the reception component 1302. In addition, the transceiver 1430 receives information from the processing system 1410, specifically the transmission component 1306, and generates a signal to be applied to the one or more antennas 1435 based at least in part on the received information.

The processing system 1410 includes a processor 1420 coupled to a computer-readable medium/memory 1425. The processor 1420 is responsible for general processing, including the execution of software stored on the computer-readable medium/memory 1425. The software, when executed by the processor 1420, causes the processing system 1410 to perform the various functions described herein for any particular apparatus. The computer-readable medium/memory 1425 may also be used for storing data that is manipulated by the processor 1420 when executing software. The processing system further includes at least one of the illustrated components. The components may be software modules running in the processor 1420, resident/stored in the computer readable medium/memory 1425, one or more hardware modules coupled to the processor 1420, or some combination thereof.

In some aspects, the processing system 1410 may be a component of the base station 110 and may include the memory 282 and/or at least one of the TX MIMO processor 266, the RX processor 258, and/or the controller/processor 280.

In some aspects, the apparatus 1405 for wireless communication includes means for receiving, from a first UE, a request to activate a sidelink resource based at least in part on an indication of a transmission on the sidelink resource for reception communicated between the first UE and a second UE; and transmitting, to the first UE, a response indicating that the sidelink resource for reception has been activated for sidelink communication between the first UE and the second UE.

In some aspects, the apparatus 1405 for wireless communication includes means for transmitting, to the first UE, a deactivation message indicating that the sidelink resource for reception has been deactivated for sidelink communication between the first UE and the second UE.

In some aspects, the apparatus 1405 for wireless communication includes means for determining a duration for an activation of the sidelink resource for reception; and transmitting an indication of the duration to the first UE.

The aforementioned means may be one or more of the aforementioned components of the apparatus 1300 and/or the processing system 1410 of the apparatus 1405 configured to perform the functions recited by the aforementioned means. As described elsewhere herein, the processing system 1410 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 14 is provided as an example. Other examples may differ from what is described in connection with FIG. 14.

Figure 15:
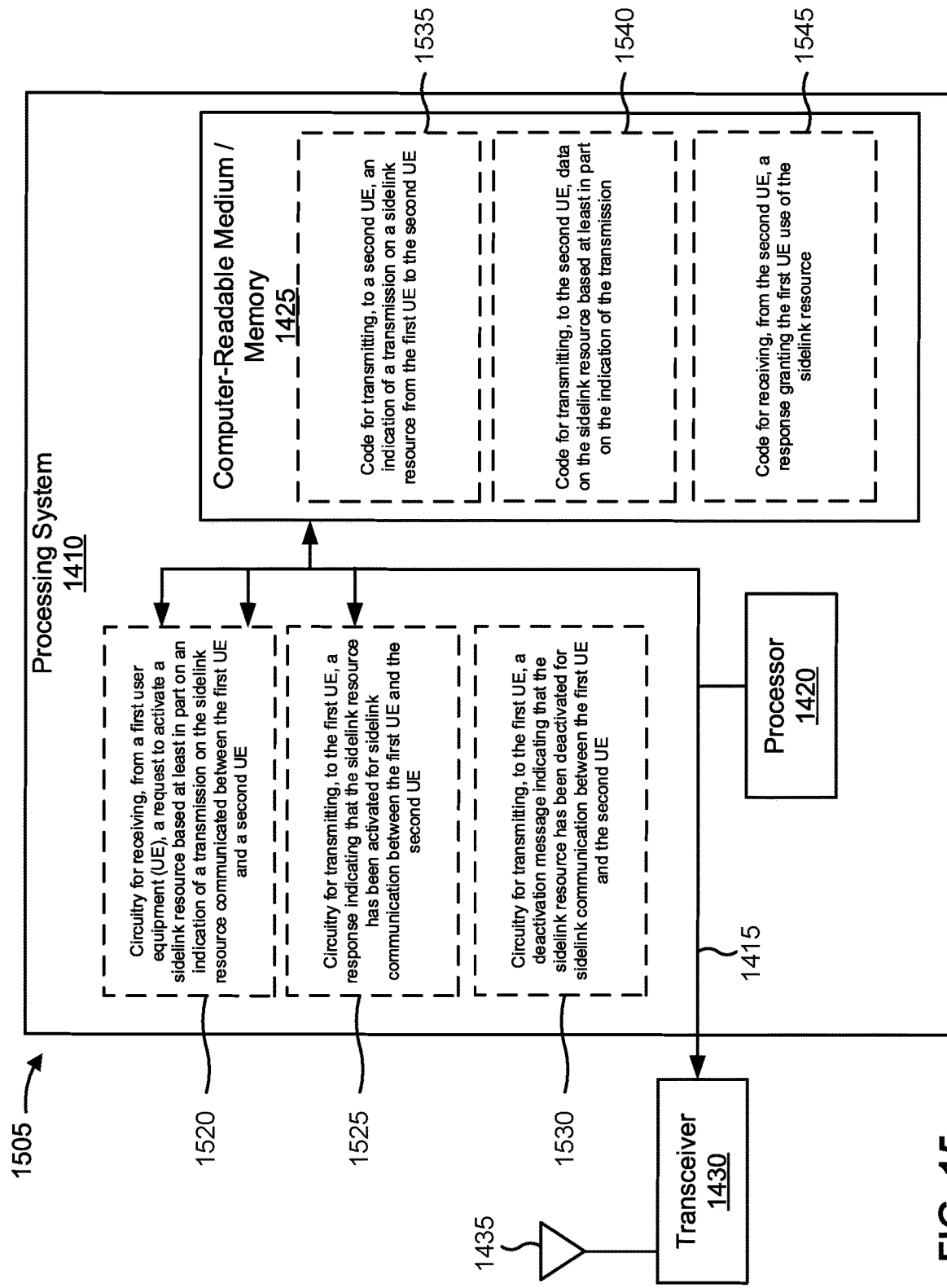
FIG. 15 is a diagram illustrating an example of an implementation of code and circuitry for an apparatus, in accordance with the present disclosure.

FIG. 15 is a diagram illustrating an example 1100 of an implementation of code and circuitry for an apparatus 1505. The apparatus 1505 may be a base station.

As further shown in FIG. 15, the apparatus may include circuitry for receiving, from a first UE, a request to activate a sidelink resource based at least in part on an indication of a transmission on the sidelink resource for reception communicated between the first UE and a second UE (circuitry 1520). For example, the apparatus may include circuitry to enable the apparatus to receive, from a first UE, a request to activate a sidelink resource based at least in part on an indication of a transmission on the sidelink resource for reception communicated between the first UE and a second UE.

As further shown in FIG. 15, the apparatus may include circuitry for transmitting, to the first UE, a response indicating that the sidelink resource for reception has been activated for sidelink communication between the first UE and the second UE (circuitry 1525). For example, the apparatus may include circuitry to enable the apparatus to transmit, to the first UE, a response indicating that the sidelink resource for reception has been activated for sidelink communication between the first UE and the second UE.

As further shown in FIG. 15, the apparatus may include circuitry for transmitting, to the first UE, a deactivation message indicating that the sidelink resource for reception has been deactivated for sidelink communication between the first UE and the second UE (circuitry 1530). For example, the apparatus may include circuitry to enable the apparatus to transmit, to the first UE, a deactivation message indicating that the sidelink resource for reception has been deactivated for sidelink communication between the first UE and the second UE.

As further shown in FIG. 15, the apparatus may include, stored in computer-readable medium 1425, code for receiving, from a first UE, a request to activate a sidelink resource based at least in part on an indication of a transmission on the sidelink resource for reception communicated between the first UE and a second UE (code 1535). For example, the apparatus may include code that, when executed by the processor 1420, may cause the processor 1420 to receive, from a first UE, a request to activate a sidelink resource based at least in part on an indication of a transmission on the sidelink resource for reception communicated between the first UE and a second UE.

As further shown in FIG. 15, the apparatus may include, stored in computer-readable medium 1425, code for transmitting, to the first UE, a response indicating that the sidelink resource for reception has been activated for sidelink communication between the first UE and the second UE (code 1540). For example, the apparatus may include code that, when executed by the processor 1420, may cause the transceiver 1430 to transmit, to the first UE, a response indicating that the sidelink resource for reception has been activated for sidelink communication between the first UE and the second UE.

As further shown in FIG. 15, the apparatus may include, stored in computer-readable medium 1425, code for transmitting, to the first UE, a deactivation message indicating that the sidelink resource for reception has been deactivated for sidelink communication between the first UE and the second UE (code 1545). For example, the apparatus may include code that, when executed by the processor 1420, may cause the transceiver 1430 to transmit, to the first UE, a deactivation message indicating that the sidelink resource for reception has been deactivated for sidelink communication between the first UE and the second UE.

FIG. 15 is provided as an example. Other examples may differ from what is described in connection with FIG. 15.

The following Aspects provide some examples relating to the present disclosure:

Aspect 1: A method of wireless communication performed by a first user equipment (UE), comprising: transmitting, to a second UE, an indication of a transmission on a sidelink resource for reception from the first UE to the second UE; and transmitting, to the second UE, data on the sidelink resource for reception based at least in part on the indication of the transmission.

Aspect 2: The method of Aspect 1, wherein the sidelink resource for reception includes one or more configured sidelink resources for reception at the second UE.

Aspect 3: The method of Aspect 2, further comprising: receiving an indication of the one or more configured sidelink resources from a base station or a relay UE.

Aspect 4: The method of any of Aspects 1-3, wherein the indication is transmitted to the second UE before the data on the sidelink resource for reception from the first UE to the second UE.

Aspect 5: The method of any of Aspects 1-4, wherein the indication transmitted to the second UE is to activate the sidelink resource for reception to carry the data on the sidelink resource for reception.

Aspect 6: The method of any of Aspects 1-5, wherein the indication includes an index of the sidelink resource for reception, wherein the sidelink resource for reception is included in a configured sidelink resource configuration.

Aspect 7: The method of any of Aspects 1-6, wherein the indication specifies one or more of a sidelink component carrier or a sidelink resource pool to be used by the first UE to transmit the data on the sidelink resource for reception.

Aspect 8: The method of any of Aspects 1-7, wherein transmitting the indication comprises: transmitting the indication in sidelink control information based at least in part on at least one of: a sidelink control channel, a sidelink shared channel, a media access control (MAC) control element (CE), or a pseudo-random sequence.

Aspect 9: The method of any of Aspects 1-8, wherein a transmission of the indication to the second UE and a transmission of the data to the second UE is separated by a predefined time gap.

Aspect 10: The method of any of Aspects 1-9, further comprising: receiving, from the second UE, a response granting the first UE use of the sidelink resource for reception, and wherein the data is transmitted on the sidelink resource for reception based at least in part on the response received from the second UE.

Aspect 11: The method of Aspect 10, wherein a receipt of the response from the second UE and a transmission of the data to the second UE are separated by a predefined time gap.

Aspect 12: The method of any of Aspects 1-11, further comprising: transmitting, to the second UE, a signal to modify a parameter associated with the sidelink resource for reception.

Aspect 13: The method of any of Aspects 1-12, wherein the indication includes information indicating a duration of an activation of the sidelink resource for reception.

Aspect 14: The method of Aspect 13, wherein the first UE is not allowed to transmit on the sidelink resource for reception after the activation of the sidelink resource for reception expires.

Aspect 15: The method of Aspect 13, further comprising: transmitting a request to extend the duration of the activation of the sidelink resource for reception; and receiving, from the second UE, a grant to extend the duration of the activation of the sidelink resource for reception.

Aspect 16: The method of any of Aspects 1-15, further comprising: transmitting, to the second UE, an indication to deactivate the sidelink resource for reception.

Aspect 17: The method of any of Aspects 1-16, wherein the sidelink resource for reception is deactivated using PC5-radio resource control (RRC) signaling between the first UE and the second UE, wherein deactivation of the sidelink resource for reception involves a modification to one or more parameters including an activation time.

Aspect 18: The method of any of Aspects 1-17, further comprising: receiving, from a base station, a second indication to deactivate the sidelink resource for reception.

Aspect 19: The method of any of Aspects 1-18, further comprising: receiving, from a base station via the second UE, a second indication to deactivate the sidelink resource for reception.

Aspect 20: A method of wireless communication performed by a first user equipment (UE), comprising: receiving an indication of a sidelink resource for reception of a transmission; and receiving data on the sidelink resource for reception based at least in part on the indication of the transmission.

Aspect 21: The method of Aspect 20, wherein the sidelink resource includes one or more configured sidelink resources for reception at the first UE.

Aspect 22: The method of any of Aspects 20-21, further comprising: activating the sidelink resource for reception in accordance with the indication.

Aspect 23: The method of any of Aspects 20-22, wherein the indication specifies one or more of a sidelink component carrier or a sidelink resource pool to be used to transmit the data on the sidelink resource for reception.

Aspect 24: The method of any of Aspects 20-23, further comprising: transmitting, to a second UE, a response not granting the second UE use of the sidelink resource for reception.

Aspect 25: The method of any of Aspects 20-24, further comprising: transmitting, to a second UE, a response granting the second UE use of the sidelink resource for reception, and wherein the data is received on the sidelink resource for reception based at least in part on the response transmitted to the second UE.

Aspect 26: The method of any of Aspects 20-25, further comprising: transmitting, to a second UE, an indication to deactivate the sidelink resource for reception.

Aspect 27: A method of wireless communication performed by a base station, comprising: receiving, from a first user equipment (UE), a request to activate a sidelink resource for reception based at least in part on an indication of a transmission on the sidelink resource for reception communicated between the first UE and a second UE; and transmitting, to the first UE, a response indicating that the sidelink resource for reception has been activated for sidelink communication between the first UE and the second UE.

Aspect 28: The method of Aspect 27, further comprising: transmitting, to the first UE, a deactivation message indicating that the sidelink resource has been deactivated for sidelink communication between the first UE and the second UE.

Aspect 29: An apparatus for wireless communication at a device, comprising a processor; memory coupled with the processor; and instructions stored in the memory and executable by the processor to cause the apparatus to perform the method of one or more of Aspects 1-28.

Aspect 30: A device for wireless communication, comprising a memory and one or more processors coupled to the memory, the one or more processors configured to perform the method of one or more of Aspects 1-28.

Aspect 31: An apparatus for wireless communication, comprising at least one means for performing the method of one or more of Aspects 1-28.

Aspect 32: A non-transitory computer-readable medium storing code for wireless communication, the code comprising instructions executable by a processor to perform the method of one or more of Aspects 1-28.

Aspect 32: A non-transitory computer-readable medium storing a set of instructions for wireless communication, the set of instructions comprising one or more instructions that, when executed by one or more processors of a device, cause the device to perform the method of one or more of Aspects 1-28.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:
  one or more memories; and
  one or more processors, coupled to the one or more memories, the one or more processors individually or collectively configured to:
    transmit, to a second UE, an indication of a transmission on a sidelink resource, wherein:
      the indication is a wakeup signal for the second UE,
      the indication includes an index of the sidelink resource,
      the sidelink resource is based at least in part on a sequence, and
      the sidelink resource corresponds to a sidelink resource configuration that is mapped to an initialization of the sequence; and
    transmit, to the second UE, data on the sidelink resource based at least in part on the indication of the transmission.

2. The first UE of claim 1, wherein the sidelink resource is based at least in part on one or more of:
  a slot index,
  a sub-channel, or
  a cyclic shift.

3. The first UE of claim 1, wherein the one or more processors are further individually or collectively configured to:
  receive, from a base station or a relay UE, an indication of one or more configured sidelink resources, wherein the sidelink resource includes the one or more configured sidelink resources.

4. The first UE of claim 1, wherein the indication is transmitted to the second UE before the data on the sidelink resource.

5. The first UE of claim 1, wherein the indication transmitted to the second UE is to activate the sidelink resource to carry the data on the sidelink resource.

6. The first UE of claim 1, wherein the sidelink resource configuration is a configured sidelink resource configuration.

7. The first UE of claim 1, wherein the indication specifies one or more of a sidelink component carrier or a sidelink resource pool to be used by the first UE to transmit the data on the sidelink resource.

8. The first UE of claim 1, wherein the one or more processors, to transmit the indication, are individually or collectively configured to:
  transmit the indication in sidelink control information based at least in part on at least one of:
    a sidelink control channel,
    a sidelink shared channel,
    a media access control (MAC) control element (CE), or
    a pseudo-random sequence.

9. The first UE of claim 1, wherein a transmission of the indication to the second UE and a transmission of the data to the second UE is separated by a predefined time gap.

10. The first UE of claim 1, wherein the one or more processors are further individually or collectively configured to:
  receive, from the second UE, a response granting the first UE use of the sidelink resource, and
  wherein the data is transmitted on the sidelink resource based at least in part on the response received from the second UE.

11. The first UE of claim 10, wherein a receipt of the response from the second UE and a transmission of the data to the second UE are separated by a predefined time gap.

12. The first UE of claim 1, wherein the one or more processors are further individually or collectively configured to:
  transmit, to the second UE, a signal to modify a parameter associated with the sidelink resource.

13. The first UE of claim 1, wherein the indication includes information indicating a duration of an activation of the sidelink resource.

14. The first UE of claim 13, wherein the first UE is not allowed to transmit on the sidelink resource after the activation of the sidelink resource expires.

15. The first UE of claim 13, wherein the one or more processors are further individually or collectively configured to:
  transmit a request to extend the duration of the activation of the sidelink resource; and
  receive, from the second UE, a grant to extend the duration of the activation of the sidelink resource.

16. The first UE of claim 1, wherein the one or more processors are further individually or collectively configured to:
  transmit, to the second UE, an indication to deactivate the sidelink resource.

17. The first UE of claim 1, wherein the sidelink resource is deactivated using PC5-radio resource control (RRC) signaling between the first UE and the second UE, wherein deactivation of the sidelink resource involves a modification to one or more parameters including an activation time.

18. The first UE of claim 1, wherein the one or more processors are further individually or collectively configured to:
  receive, from a base station, a second indication to deactivate the sidelink resource.

19. The first UE of claim 1, wherein the one or more processors are further individually or collectively configured to:
  receive, from a base station via the second UE, a second indication to deactivate the sidelink resource.

20. A first user equipment (UE) for wireless communication, comprising:
  one or more memories; and
  one or more processors, coupled to the one or more memories, the one or more processors individually or collectively configured to:
    receive an indication of a transmission on a sidelink resource, wherein:
      the indication is a wakeup signal for the first UE,
      the indication includes an index of the sidelink resource,
      the sidelink resource is based at least in part on a sequence, and the sidelink resource corresponds to a sidelink resource configuration that is mapped to an initialization of the sequence; and receive data on the sidelink resource based at least in part on the indication.

21. The first UE of claim 20, wherein the sidelink resource is based at least in part on one or more of:
a slot index,
a sub-channel, or
a cyclic shift.

22. The first UE of claim 20, wherein the one or more processors are further individually or collectively configured to:
activate the sidelink resource in accordance with the indication.

23. The first UE of claim 20, wherein the indication specifies one or more of a sidelink component carrier or a sidelink resource pool to be used to transmit the data on the sidelink resource.

24. The first UE of claim 20, wherein the one or more processors are further individually or collectively configured to:
transmit, to a second UE, a response not granting the second UE use of the sidelink resource.

25. The first UE of claim 20, wherein the one or more processors are further individually or collectively configured to:
transmit, to a second UE, a response granting the second UE use of the sidelink resource, and
wherein the data is received on the sidelink resource based at least in part on the response transmitted to the second UE.

26. The first UE of claim 20, wherein the one or more processors are further configured to:
transmit, to a second UE, an indication to deactivate the sidelink resource.

27. A base station for wireless communication, comprising:
one or more memories; and
one or more processors, coupled to the one or more memories, the one or more processors individually or collectively configured to:
receive, from a first user equipment (UE), a request to activate a sidelink resource based at least in part on an indication of a transmission on the sidelink resource, wherein;
the request includes an index of the sidelink resource,
the sidelink resource is based at least in part on a sequence, and
the sidelink resource corresponds to a sidelink resource configuration that is mapped to an initialization of the sequence; and
transmit, to the first UE, a response indicating that the sidelink resource has been activated for sidelink communication between the first UE and a second UE.

28. The base station of claim 27, wherein the one or more processors are further individually or collectively configured to:
transmit, to the first UE, a deactivation message indicating that the sidelink resource has been deactivated for sidelink communication between the first UE and the second UE.

29. A method of wireless communication performed by a first user equipment (UE), comprising:
transmitting, to a second UE, an indication of a transmission on a sidelink resource, wherein:
the indication is a wakeup signal for the second UE,
the indication includes an index of the sidelink resource,
the sidelink resource is based at least in part on a sequence, and
the sidelink resource corresponds to a sidelink resource configuration that is mapped to an initialization of the sequence; and
transmitting, to the second UE, data on the sidelink resource based at least in part on the indication of the transmission.

30. The method of claim 29, wherein the sidelink resource is based at least in part on one or more of:
a slot index,
a sub-channel, or
a cyclic shift.

* * * * *